United States Patent
Guan et al.

(10) Patent No.: US 11,206,679 B2
(45) Date of Patent: Dec. 21, 2021

(54) RESOURCE PROCESSING METHOD AND APPARATUS

(71) Applicant: HUAWEI TECHNOLOGIES CO., LTD., Guangdong (CN)

(72) Inventors: Peng Guan, Chengdu (CN); Xiaoyong Tang, Shenzhen (CN); Lei Chen, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 45 days.

(21) Appl. No.: 16/579,585

(22) Filed: Sep. 23, 2019

(65) Prior Publication Data

US 2020/0022171 A1    Jan. 16, 2020

Related U.S. Application Data

(63) Continuation of application No. PCT/CN2018/079779, filed on Mar. 21, 2018.

(30) Foreign Application Priority Data

Mar. 24, 2017    (CN) .......................... 201710184796.4

(51) Int. Cl.
    *H04W 72/12*      (2009.01)
    *H04W 72/04*      (2009.01)
    *H04W 16/28*      (2009.01)

(52) U.S. Cl.
    CPC ... *H04W 72/1273* (2013.01); *H04W 72/0446* (2013.01); *H04W 72/0453* (2013.01); *H04W 16/28* (2013.01)

(58) Field of Classification Search
    CPC ......... H04W 72/1273; H04W 72/0446; H04W 72/0453; H04W 16/28; H04W 72/1289;
    (Continued)

(56) References Cited

U.S. PATENT DOCUMENTS

2013/0039188 A1    2/2013  Larsson et al.
2013/0242882 A1    9/2013  Blankenship et al.
         (Continued)

FOREIGN PATENT DOCUMENTS

CN    102577568 A    7/2012

OTHER PUBLICATIONS

3GPP TS 36.211 V14.2.0 (Mar. 2017),3rd Generation Partnership Project;Technical Specification Group Radio Access Network,Evolved Universal Terrestrial Radio Access (E-UTRA);Physical channels and modulation(Release 14),dated Mar. 2017,total 196 pages.
(Continued)

*Primary Examiner* — Diane D Mizrahi
(74) *Attorney, Agent, or Firm* — Womble Bond Dickinson (US) LLP

(57) ABSTRACT

This application provides a resource processing method and apparatus. The method includes: determining, by a network device, at least two beams that need to be transmitted; determining, by the network device, a time-frequency resource corresponding to each of the at least two beams; and determining, by the network device, a part of the time-frequency resource corresponding to each beam to serve as a common search space, where the part that corresponds to the common search space and that is of the time-frequency resource is used to carry control information transmitted to a terminal device. The resource processing method and apparatus provided in the embodiments of this application can ensure that all terminal devices detect a complete common search space when the terminal devices are distributed in different directions.

20 Claims, 10 Drawing Sheets

(58) Field of Classification Search
CPC ... H04B 7/0695; H04L 1/0038; H04L 5/0023; H04L 5/0094; H04L 5/0053; H04L 5/001; H04L 5/0037; H04L 5/0044; H04L 5/0078

See application file for complete search history.

(56) References Cited

U.S. PATENT DOCUMENTS

| | | | |
|---|---|---|---|
| 2013/0279356 A1 | 10/2013 | Park et al. | |
| 2019/0132829 A1* | 5/2019 | Bhattad | H04L 5/0039 |
| 2019/0182784 A1* | 6/2019 | Harada | H04W 16/28 |

OTHER PUBLICATIONS

3GPP TS 36.212 V14.2.0 (Mar. 2017),3rd Generation Partnership Project;Technical Specification Group Radio Access Network,Evolved Universal Terrestrial Radio Access (E-UTRA);Multiplexing and channel coding(Release 14),dated Mar. 2017,total 197 pages.

3GPP TS 36.213 V13.5 0 (Mar. 2017);3rd Generation Partnership Project;Technical Specification Group Radio Access Network,Evolved Universal Terrestrial Radio Access (E-UTRA);Physical layer procedures(Release 13);total 387 pages.

TS V5G.212 V1.5; Verizon 5G TF; Air Interface Working Group; Verizon 5th Generation Radio Access; Multiplexing and channel coding(Release 1); Sep. 2016; Cisco, Ericsson, Intel Corp., LG Electronics, Nokia, Qualcomm Technologies Inc., Samsung Electronics and Verizon 1.5; total 62 pages.

TS V5G.213 v1.4; Verizon 5G TF; Air Interface Working Group; Verizon 5th Generation Radio Access; Physical layer procedures (Release 1); Oct. 2016; Cisco, Ericsson, Intel Corp., LG Electronics, Nokia, Qualcomm Technologies Inc., Samsung and Verizon V 1.4; total 50 pages.

TS V5G.211 V1.7; Verizon 5G TF; Air Interface Working Group; Verizon 5th Generation Radio Access; Physical channels and modulation (Release 1); Oct. 2016; Cisco, Ericsson, Intel Corp., LG Electronics, Nokia, Qualcomm Technologies Inc., Samsung Electronics and Verizon V 1.7; total 83 pages.

R1-1701951; Guangdong OPPO Mobile Telecom; Search space design consideration for NR PDCCH; 3GPP TSG RAN WG1 meeting #88; Athens, Greece Feb. 13-17, 2017; Agenda ltem:8.1.3.1.4; total 5 pages.

R1-1701640; Huawei, HiSilicon; Search space design aspects; Agenda ltem:8.1.3.1.4; 3GPP TSG RAN WG1 Meeting #88; Athens, Greece, Feb. 13-17, 2017; total 5 pages.

* cited by examiner

RESOURCE PROCESSING METHOD AND APPARATUS

CROSS-REFERENCE TO RELATED APPLICATIONS

This application is a continuation of International Application No. PCT/CN2018/079779, filed on Mar. 21, 2018 which claims priority to Chinese Patent Application No. 201710184796.4, filed on Mar. 24, 2017, the disclosures of the aforementioned applications being hereby incorporated by reference in their entireties.

TECHNICAL FIELD

This application relates to communications technologies, and in particular, to a resource processing method and apparatus.

BACKGROUND

In a beamforming technology, a higher gain of an antenna array can be achieved by controlling a radio frequency (RF) link to transmit a beam spatially in a direction. Therefore, the beamforming technology has become a hot topic of research on reduction of a loss in communication transmission. However, in the beamforming technology, a beam transmitted by one RF link can face only one direction within a time range corresponding to an orthogonal frequency division multiplexing (OFDM) symbol. As an example, an RF link cannot transmit beams in two directions within a time range corresponding to one symbol.

In a communications system, before receiving or transmitting data, a terminal device needs to obtain downlink control information that is configured by a network device for the terminal device and carried in a common search space. A time-frequency resource occupied by the common search space is divided into a plurality of control channel elements (CCEs), and the CCEs that constitute the common search space are usually distributed on frequency domain resources corresponding to different symbols. As an example, downlink control information carried in the common search space may be distributed on frequency domain resources corresponding to different symbols.

Therefore, in an example in which the network device has only one RF link that transmits beams, when the beamforming technology is applied to the communications system and when all beams corresponding to symbols occupied by the common search space face a first direction, only a terminal device in the first direction can detect the common search space, and terminal devices in other directions cannot detect the common search space; when beams corresponding to symbols occupied by the common search space face different directions, all terminal devices distributed in different directions cannot detect a complete common search space. However, a quantity of RF links of the network device is much smaller than a quantity of possible directions of the terminal device. Even if different RF links face different directions, a problem of being unable to cover all possible directions still exists. Therefore, in the prior art, when terminal devices are distributed in different directions, there is a problem that terminal devices in some directions cannot detect a complete common search space, and cannot receive the downlink control information carried in the common search space.

SUMMARY

This application provides a resource processing method and apparatus, to resolve the following problem: When a beamforming technology is applied to an existing communications system, terminal devices in some directions cannot detect a complete common search space, and cannot receive downlink control information carried in a common search space.

An aspect of this application provides a resource processing method applicable to a network device. The method includes:

determining, by a network device based on information about a direction of a terminal device, at least two beams that need to be transmitted;

determining a time-frequency resource corresponding to each of the at least two beams; and determining a time-frequency resource to serve as a common search space in the time-frequency resource corresponding to each beam, where a part that corresponds to the common search space and that is of the time-frequency resource is used to carry control information transmitted to the terminal device.

The network device determines, based on the information about the direction of the terminal device that needs to receive the control information, the at least two beams that need to be transmitted, where the at least two beams are used to ensure that each terminal device that needs to receive the control information can receive the control information. The network device adaptively adjusts a quantity of beams based on a quantity of directions of the terminal device. By allocating a common search space to each beam, each terminal device can detect a complete common search space when terminal devices are distributed in different directions. In addition, the network device can transmit more beams in one subframe without increasing radio frequency links, thereby increasing coverage, speeding up transmission of the control information, and reducing a transmission delay of the control information.

In one embodiment, the resource processing method further includes:

transmitting, by the network device, resource location information to the terminal device, where the resource location information is used to indicate a location of the common search space in the time-frequency resource.

By directly transmitting the resource location information of the common search space to the terminal device, the terminal device can directly determine the common search space based on the resource location information, without necessity of calculating a location of the common search space, thereby reducing a workload of the terminal device, and increasing a speed of the terminal device in receiving the control information carried in the common search space.

In one embodiment, the resource location information is used to indicate a location of a physical downlink control channel in the time-frequency resource corresponding to the common search space, where the physical downlink control channel is occupied in the common search space by the control information carried in the common search space.

By directly transmitting the resource location information of the physical downlink control channel in the common search space to the terminal device, where the physical downlink control channel carries downlink control information to be received by a plurality of terminal devices, the terminal devices can check directly without blind detection and obtain downlink control information carried in the physical downlink control channel, thereby reducing a quantity of times of blind detection performed by the terminal devices, and reducing complexity of detecting the downlink control information.

In one embodiment, the control information includes downlink control information, and the downlink control information is used to indicate a configuration parameter for uplink and downlink data transmission of the terminal device.

In one embodiment, the downlink control information further includes control channel symbol information.

By adding the downlink control information to the common search space and using the control channel symbol information as a part of the downlink control information, the terminal device can determine, based on the received control channel symbol information, information about symbols occupied by the reference signal, the downlink control information, and the hybrid automatic repeat request feedback information that are transmitted by the network device, and determine information about a symbol occupied by data information transmitted by the network device.

In one embodiment, the resource processing method further includes:

mapping, by the network device, one piece of downlink control information to each common search space.

In one embodiment, the downlink control information mapped to each common search space is downlink control information that is common to at least one terminal device in a cell, for example, system information or paging information.

In one embodiment, the downlink control information mapped to each common search space may be downlink control information of a terminal device. In this case, the network device uses higher layer signaling to notify the terminal device of resource location information of a resource occupied by the downlink control information, and an identifier of performing a cyclic redundancy check, so that the terminal device receives the downlink control information based on the resource location information and the identifier.

By mapping one piece of downlink control information to each common search space, all terminal devices in a direction corresponding to each beam can detect the common search space, and can further receive the downlink control information carried in the common search space.

In one embodiment, the determining, by a network device, at least two beams that need to be transmitted includes:

determining, by the network device based on a type of the control information, the at least two beams that need to be transmitted; or determining, by the network device based on information about a direction of the terminal device, at least two beams that need to be transmitted; or determining, by the network device based on a beam width, the at least two beams that need to be transmitted.

In one embodiment, the determining, by the network device, a time-frequency resource corresponding to each of the at least two beams includes:

determining, by the network device, a symbol group corresponding to each of the at least two beams, and obtaining, based on a time-frequency resource corresponding to the symbol group, the time-frequency resource corresponding to each of the at least two beams, where each symbol group includes at least one symbol, where the part that corresponds to each common search space and that is of the time-frequency resource is distributed on at least one symbol in each symbol group.

In one embodiment, the symbol is a minimum unit into which a time-frequency resource is divided in time domain.

In one embodiment, the resource location information includes at least one piece of symbol group information, and frequency domain resource information corresponding to each piece of symbol group information.

Because symbol group information and corresponding frequency domain resource information of each common search space are transmitted to the terminal device, the terminal device can directly determine location information of the common search space based on the symbol group information and the frequency domain resource information, and when determining a common search space corresponding to each beam in the time-frequency resource, the network device can flexibly set the location of the common search space corresponding to each different beam.

In one embodiment, the resource processing method further includes:

determining, by the network device, a part of the time-frequency resource corresponding to each beam to carry control frame format indicator information, where the control frame format indicator information is used to indicate control channel symbol information, and the part of the time-frequency resource for carrying the control frame format indicator information does not overlap the part that corresponds to the common search space and that is of the time-frequency resource.

Because the control frame format indicator information is carried in the time-frequency resource corresponding to each beam, it is convenient for the terminal device to obtain, based on the control frame format indicator information, the resource location information of the common search space in the time-frequency resource corresponding to each beam. Therefore, a common search space corresponding to each symbol may be at a different location in the time-frequency resource, thereby being highly flexible. This also prevents the network device from transmitting the resource location information of the common search space corresponding to each symbol to the terminal device, and reduces signaling overheads.

In one embodiment, the resource processing method further includes:

determining, by the network device, a part of the time-frequency resource corresponding to each beam to serve as a dedicated search space, where the part that corresponds to the dedicated search space and that is of the time-frequency resource is used to carry control information that needs to be received by one terminal device.

In one embodiment, the resource processing method further includes:

determining, by the network device, a part of the time-frequency resource corresponding to each beam to carry a reference signal, where the reference signal is used to assist the terminal device in obtaining the control information, and the part of the time-frequency resource for carrying the reference signal does not overlap the part that corresponds to the common search space and that is of the time-frequency resource.

In one embodiment, the resource processing method further includes:

determining, by the network device, a part of the time-frequency resource corresponding to each beam to carry hybrid automatic repeat request feedback information, where the hybrid automatic repeat request feedback information includes a response of the network device to receiving of uplink data from the terminal device, and the part of the time-frequency resource for carrying the hybrid automatic repeat request feedback information does not overlap the part that corresponds to the common search space and that is of the time-frequency resource.

The reference signal and the hybrid automatic repeat request feedback information are mapped to the frequency domain resource corresponding to each beam, so that the terminal device in the direction corresponding to each beam can successfully receive the reference signal and the hybrid automatic repeat request feedback information, thereby preventing the following problem: terminal devices in some directions cannot receive the downlink control information due to failure of receiving the reference signal and the hybrid automatic repeat request feedback information.

In one embodiment, the resource location information includes frequency domain resource information.

By setting a consistent resource location occupied by common search spaces on frequency domain resources corresponding to different symbols, the network device transmits only the frequency domain resource information when transmitting the resource location information, thereby reducing signaling overheads.

In one embodiment, the transmitting, by the network device, resource location information to the terminal device includes: transmitting, by the network device, the resource location information of the common search space to the terminal device through higher layer signaling.

In one embodiment, the transmitting, by the network device, resource location information to the terminal device includes: transmitting, by the network device, the resource location information of the common search space in broadcast mode.

In one embodiment, the control channel symbol information is at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

In one embodiment, the resource processing method further includes:

transmitting, by the network device, control channel symbol information to the terminal device through higher layer signaling.

In one embodiment, the higher layer signaling is any one of the following:

medium access control-control unit signaling, non-access stratum signaling, radio resource control signaling, packet data convergence protocol signaling, or radio link control signaling.

In one embodiment, the symbol group corresponding to each beam includes a different quantity of symbols.

By allocating a symbol group that includes a different quantity of symbols to each different beam, the network device transmits each beam by occupying a different quantity of symbols, so that the common search space and downlink control information carried in the common search space are distributed more flexibly in the time-frequency resource.

In one embodiment, the symbol group corresponding to each beam includes a same quantity of symbols.

In one embodiment, the control frame format indicator information is at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

An embodiment of this application further provides a resource processing method. The resource processing method is applied to a terminal device and corresponds to the foregoing resource processing method applied to a network device side, and has corresponding technical features and technical effects. This is not described in detail again in this application.

Another aspect of the embodiments of this application further provides a resource processing method, including:

receiving, by a terminal device, resource location information transmitted by a network device, where the resource location information is used to indicate a location of at least one common search space in a time-frequency resource; and detecting, based on the resource location information, whether control information carried in a common search space exists.

In one embodiment, the resource location information includes frequency domain location information; and the detecting, by the terminal device based on the resource location information, whether control information carried in a common search space exists includes:

determining, by the terminal device by starting from a first symbol of a current subframe, a common search space at a frequency domain location in a frequency domain resource corresponding to the first symbol, and detecting whether control information is carried in the common search space; and determining, if no control information is carried in the common search space, a common search space within a time range corresponding to a next symbol of the current subframe and at a frequency domain location in a frequency domain resource corresponding to the second symbol, and detecting whether control information is carried in the common search space, until the control information is detected or all symbols indicated by a maximum quantity of symbols are traversed, where the maximum quantity of symbols is used to indicate a maximum value of the quantity of symbols on which the common search space is distributed in the current subframe.

In one embodiment, the resource location information includes at least one piece of symbol group information, and frequency domain location information corresponding to each piece of symbol group information, and one symbol group includes at least one symbol; and the detecting, by the terminal device based on the resource location information, whether control information carried in a common search space exists includes:

determining, by the terminal device, a common search space within a time range corresponding to a first symbol group and at a frequency domain location in a frequency domain resource corresponding to the first symbol group, and detecting whether control information is carried in the common search space; and determining, if no control information is carried in the common search space, a common search space within a time range corresponding to a next symbol group and at a frequency domain location in a frequency domain resource corresponding to the next symbol group, and detecting whether control information is carried in the common search space, until the control information is detected or all symbol groups are traversed.

In one embodiment, the symbol is a minimum unit into which a time-frequency resource is divided in time domain.

In one embodiment, the receiving, by a terminal device, resource location information transmitted by a network device includes:

receiving, by the terminal device, resource location information of the common search space, where the resource location information is transmitted by the network device through higher layer signaling.

In one embodiment, the receiving, by a terminal device, resource location information transmitted by a network device includes:

receiving, by the terminal device, resource location information of the common search space, where the resource location information is transmitted by the network device in broadcast mode.

In one embodiment, the control information includes downlink control information, and the downlink control information is used to indicate a configuration parameter for uplink and downlink data transmission of the terminal device.

In one embodiment, the downlink control information includes control channel symbol information.

In one embodiment, the resource processing method further includes:

receiving, by the terminal device, control channel symbol information transmitted by the network device through higher layer signaling.

In one embodiment, the control channel symbol information is at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

In one embodiment, the higher layer signaling is any one of the following:

medium access control-control unit signaling, non-access stratum signaling, radio resource control signaling, packet data convergence protocol signaling, or radio link control signaling.

In one embodiment, the resource processing method further includes:

detecting, by the terminal device, whether control frame format indicator information carried on a physical control format indicator channel exists in all symbols indicated by a maximum quantity of symbols of the current subframe, where the control frame format indicator information is used to indicate the control channel symbol information.

In one embodiment, the resource processing method further includes:

detecting, by the terminal device, in a symbol group on which the control information is detected, based on the control channel symbol information, downlink control information carried in a dedicated search space.

In one embodiment, the resource processing method further includes:

detecting, by the terminal device, whether a reference signal exists on all symbols indicated by a maximum quantity of symbols of the current subframe, where the reference signal is used to assist the terminal device in obtaining the control information.

In one embodiment, the resource processing method further includes:

detecting, by the terminal device, whether hybrid automatic repeat request feedback information carried on a physical hybrid automatic repeat request indicator channel exists in all symbols indicated by a maximum quantity of symbols of the current subframe, where the hybrid automatic repeat request feedback information includes a response of the network device to receiving of uplink data from the terminal device.

An embodiment of this application further provides a resource processing apparatus. The resource processing apparatus is configured to perform the foregoing resource processing method, and has the same technical features and technical effects. This is not described in detail again in this application.

Another aspect of the embodiments of this application further provides a resource processing apparatus. The resource processing apparatus is configured to perform the resource processing method corresponding to the network device side, and includes:

a beam determining module, configured to determine at least two beams that need to be transmitted;

a time-frequency resource determining module, configured to determine a time-frequency resource corresponding to each of the at least two beams; and a common search space determining module, configured to determine a part of the time-frequency resource corresponding to each beam to serve as a common search space, where the part that corresponds to the common search space and that is of the time-frequency resource is used to carry control information transmitted to a terminal device.

In one embodiment, the resource processing apparatus further includes:

a transmitting module, configured to transmit resource location information to the terminal device, where the resource location information is used to indicate a location of the common search space in the time-frequency resource.

In one embodiment, the resource location information is used to indicate a location of a physical downlink control channel in the time-frequency resource corresponding to the common search space, where the physical downlink control channel is occupied in the common search space by the control information carried in the common search space.

In one embodiment, the control information includes downlink control information, and the downlink control information is used to indicate a configuration parameter for uplink and downlink data transmission of the terminal device.

In one embodiment, the downlink control information further includes control channel symbol information.

In one embodiment, the resource processing apparatus further includes:

a mapping module, configured to map one piece of downlink control information to each common search space.

In one embodiment, the beam determining module is configured to:

determine, based on a type of the control information, the at least two beams that need to be transmitted; or determine, based on information about a direction of the terminal device, the at least two beams that need to be transmitted; or determine, based on a beam width, the at least two beams that need to be transmitted.

In one embodiment, the time-frequency resource determining module is configured to:

determine a symbol group corresponding to each of the at least two beams, and obtain, based on a time-frequency resource corresponding to the symbol group, the time-frequency resource corresponding to each of the at least two beams, where each symbol group includes at least one symbol, where the part that corresponds to each common search space and that is of the time-frequency resource is distributed on at least one symbol in each symbol group.

In one embodiment, the resource location information includes at least one piece of symbol group information, and frequency domain resource information corresponding to each piece of symbol group information.

In one embodiment, the time-frequency resource determining module is further configured to:

determine a part of the time-frequency resource corresponding to each beam to carry control frame format indicator information, where the control frame format indicator information is used to indicate control channel symbol information, and the part of the time-frequency resource for carrying the control frame format indicator information does not overlap the part that corresponds to the common search space and that is of the time-frequency resource.

In one embodiment, the time-frequency resource determining module is further configured to:

determine a part of the time-frequency resource corresponding to each beam to serve as a dedicated search space, where the part that corresponds to the dedicated search space and that is of the time-frequency resource is used to carry control information that needs to be received by one terminal device.

In one embodiment, the time-frequency resource determining module is further configured to:

determine a part of the time-frequency resource corresponding to each beam to carry a reference signal, where the reference signal is used to assist the terminal device in obtaining the control information, and the part of the time-frequency resource for carrying the reference signal does not overlap the part that corresponds to the common search space and that is of the time-frequency resource.

In one embodiment, the time-frequency resource determining module is further configured to:

determine a part of the time-frequency resource corresponding to each beam to carry hybrid automatic repeat request feedback information, where the hybrid automatic repeat request feedback information includes a response of the network device to receiving of uplink data from the terminal device, and the part of the time-frequency resource for carrying the hybrid automatic repeat request feedback information does not overlap the part that corresponds to the common search space and that is of the time-frequency resource.

In one embodiment, the symbol is a minimum unit into which a time-frequency resource is divided in time domain.

In one embodiment, the transmitting module is configured to transmit the resource location information of the common search space to the terminal device through higher layer signaling.

In one embodiment, the transmitting module is configured to transmit the resource location information of the common search space in broadcast mode.

In one embodiment, the control channel symbol information is at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

In one embodiment, the transmitting module is further configured to transmit control channel symbol information to the terminal device through higher layer signaling.

In one embodiment, the higher layer signaling is any one of the following:

medium access control-control unit signaling, non-access stratum signaling, radio resource control signaling, packet data convergence protocol signaling, or radio link control signaling.

In one embodiment, the symbol group corresponding to each beam includes a different quantity of symbols.

In one embodiment, the symbol group corresponding to each beam includes a same quantity of symbols.

In one embodiment, the control frame format indicator information is at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

Another aspect of the embodiments of this application further provides a resource processing apparatus. The resource processing apparatus is configured to perform the resource processing method corresponding to the terminal device side, and includes:

a receiving module, configured to receive resource location information transmitted by a network device, where the resource location information is used to indicate a location of at least one common search space in a time-frequency resource; and a detection module, configured to detect, based on the resource location information, whether control information carried in a common search space exists.

In one embodiment, the resource location information includes frequency domain location information, and the detection module is configured to:

determine, by starting from a first symbol of a current subframe, a common search space at a frequency domain location in a frequency domain resource corresponding to the first symbol, and detect whether control information is carried in the common search space; and determine, if no control information is carried in the common search space, a common search space within a time range corresponding to a next symbol of the current subframe and at a frequency domain location in a frequency domain resource corresponding to the second symbol, and detect whether control information is carried in the common search space, until the control information is detected or all symbols indicated by a maximum quantity of symbols are traversed, where the maximum quantity of symbols is used to indicate a maximum value of the quantity of symbols on which the common search space is distributed in the current subframe.

In one embodiment, the resource location information includes at least one piece of symbol group information, and frequency domain location information corresponding to each piece of symbol group information, and one symbol group includes at least one symbol; and the detection module is configured to:

determine a common search space within a time range corresponding to a first symbol group and at a frequency domain location in a frequency domain resource corresponding to the first symbol group, and detect whether control information is carried in the common search space; and determine, if no control information is carried in the common search space, a common search space within a time range corresponding to a next symbol group and at a frequency domain location in a frequency domain resource corresponding to the next symbol group, and detect whether control information is carried in the common search space, until the control information is detected or all symbol groups are traversed.

In one embodiment, the symbol is a minimum unit into which a time-frequency resource is divided in time domain.

In one embodiment, the receiving module is configured to receive resource location information of the common search space, where the resource location information is transmitted by the network device through higher layer signaling.

In one embodiment, the receiving module is configured to receive resource location information of the common search space, where the resource location information is transmitted by the network device in broadcast mode.

In one embodiment, the control information includes downlink control information, and the downlink control information is used to indicate a configuration parameter for uplink and downlink data transmission of the terminal device.

In one embodiment, the downlink control information includes control channel symbol information.

In one embodiment, the receiving module is further configured to receive control channel symbol information transmitted by the network device to the terminal device through higher layer signaling.

In one embodiment, the control channel symbol information is at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

In one embodiment, the higher layer signaling is any one of the following:

medium access control-control unit signaling, non-access stratum signaling, radio resource control signaling, packet data convergence protocol signaling, or radio link control signaling.

In one embodiment, the detection module is further configured to:

detect whether control frame format indicator information carried on a physical control format indicator channel exists in all symbols indicated by a maximum quantity of symbols of the current subframe, where the control frame format indicator information is used to indicate the control channel symbol information.

In one embodiment, the detection module is further configured to:

detect, in a symbol group on which the control information is detected, based on the control channel symbol information, downlink control information carried in a dedicated search space.

In one embodiment, the detection module is further configured to:

detect whether a reference signal exists in all symbols indicated by a maximum quantity of symbols of the current subframe, where the reference signal is used to assist the terminal device in obtaining the control information.

In one embodiment, the detection module is further configured to:

detect whether hybrid automatic repeat request feedback information carried on a physical hybrid automatic repeat request indicator channel exists in all symbols indicated by a maximum quantity of symbols of the current subframe, where the hybrid automatic repeat request feedback information includes a response of the network device to receiving of uplink data from the terminal device.

An embodiment of this application further provides a network device and a terminal device. The network device and the terminal device are configured to perform the foregoing resource processing methods, and have the same technical features and technical effects. This is not described in detail again in this application.

Another aspect of the embodiments of this application further provides a network device, including a transmitter, a memory, a processor, and at least one communications bus. The communications bus is configured to implement a communication connection between components. Various programs are stored in the memory and are configured to perform various processing functions and implement the method steps or operations of this embodiment. The processor is configured to execute the programs stored in the memory.

The processor is configured to:
determine at least two beams that need to be transmitted;
determine a time-frequency resource corresponding to each of the at least two beams; and
determine a part of the time-frequency resource corresponding to each beam to serve as a common search space, where the part that corresponds to the common search space and that is of the time-frequency resource is used to carry control information transmitted to a terminal device.

In one embodiment, the network device further includes:
a transmitter, configured to transmit resource location information to the terminal device, where the resource location information is used to indicate a location of the common search space in the time-frequency resource.

In one embodiment, the resource location information is used to indicate a location of a physical downlink control channel in the time-frequency resource corresponding to the common search space, where the physical downlink control channel is occupied in the common search space by the control information carried in the common search space.

In one embodiment, the control information includes downlink control information, and the downlink control information is used to indicate a configuration parameter for uplink and downlink data transmission of the terminal device.

In one embodiment, the downlink control information further includes control channel symbol information.

In one embodiment, the processor is further configured to:
map one piece of downlink control information to each common search space.

In one embodiment, the processor is configured to:
determine, based on a type of the control information, the at least two beams that need to be transmitted; or
determine, based on information about a direction of the terminal device, the at least two beams that need to be transmitted; or
determine, based on a beam width, the at least two beams that need to be transmitted.

In one embodiment, the processor is further configured to:

determine a symbol group corresponding to each of the at least two beams, and obtain, based on a time-frequency resource corresponding to the symbol group, the time-frequency resource corresponding to each of the at least two beams, where each symbol group includes at least one symbol, where the part that corresponds to each common search space and that is of the time-frequency resource is distributed on at least one symbol in each symbol group.

In one embodiment, the resource location information includes at least one piece of symbol group information, and frequency domain resource information corresponding to each piece of symbol group information.

In one embodiment, the processor is further configured to:

determine a part of the time-frequency resource corresponding to each beam to carry control frame format indicator information, where the control frame format indicator information is used to indicate control channel symbol information, and the part of the time-frequency resource for carrying the control frame format indicator information does not overlap the part that corresponds to the common search space and that is of the time-frequency resource.

In one embodiment, the processor is further configured to:

determine a part of the time-frequency resource corresponding to each beam to serve as a dedicated search space, where the part that corresponds to the dedicated search space and that is of the time-frequency resource is used to carry control information that needs to be received by one terminal device.

In one embodiment, the processor is further configured to determine a part of the time-frequency resource corresponding to each beam to carry a reference signal, where the reference signal is used to assist the terminal device in obtaining the control information, and the part of the time-frequency resource for carrying the reference signal does not overlap the part that corresponds to the common search space and that is of the time-frequency resource.

In one embodiment, the processor is further configured to:

determine a part of the time-frequency resource corresponding to each beam to carry hybrid automatic repeat request feedback information, where the hybrid automatic repeat request feedback information includes a response of the network device to receiving of uplink data from the terminal device, and the part of the time-frequency resource for carrying the hybrid automatic repeat request feedback information does not overlap the part that corresponds to the common search space and that is of the time-frequency resource.

In one embodiment, the symbol is a minimum unit into which a time-frequency resource is divided in time domain.

In one embodiment, the transmitter is configured to:

transmit the resource location information of the common search space to the terminal device through higher layer signaling.

In one embodiment, the transmitter is configured to:

transmit the resource location information of the common search space in broadcast mode.

In one embodiment, the control channel symbol information is at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

In one embodiment, the transmitter is further configured to:

transmit control channel symbol information to the terminal device through higher layer signaling.

In one embodiment, the higher layer signaling is any one of the following:

medium access control-control unit signaling, non-access stratum signaling, radio resource control signaling, packet data convergence protocol signaling, or radio link control signaling.

In one embodiment, the symbol group corresponding to each beam includes a different quantity of symbols.

In one embodiment, the symbol group corresponding to each beam includes a same quantity of symbols.

In one embodiment, the control frame format indicator information is at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

Another aspect of the embodiments of this application further provides a terminal device, including a receiver, a memory, a processor, and at least one communications bus. The communications bus is configured to implement a communication connection between components. Various programs are stored in the memory and are used to perform various processing functions and implement the method steps or operations of this embodiment. The processor is configured to execute the programs stored in the memory.

The receiver is configured to receive resource location information transmitted by a network device, where the resource location information is used to indicate a location of at least one common search space in a time-frequency resource.

The processor is configured to detect, based on the resource location information, whether control information carried in a common search space exists.

In one embodiment, the resource location information includes frequency domain location information, and the processor is configured to:

determine, by starting from a first symbol of a current subframe, a common search space at a frequency domain location in a frequency domain resource corresponding to the first symbol, and detect whether control information is carried in the common search space; and determine, if no control information is carried in the common search space, a common search space within a time range corresponding to a next symbol of the current subframe and at a frequency domain location in a frequency domain resource corresponding to the second symbol, and detect whether control information is carried in the common search space, until the control information is detected or all symbols indicated by a maximum quantity of symbols are traversed, where the maximum quantity of symbols is used to indicate a maximum value of the quantity of symbols on which the common search space is distributed in the current subframe.

In one embodiment, the resource location information includes at least one piece of symbol group information, and frequency domain location information corresponding to each piece of symbol group information, and one symbol group includes at least one symbol; and the processor is configured to:

determine a common search space within a time range corresponding to a first symbol group and at a frequency domain location in a frequency domain resource corresponding to the first symbol group, and detect whether control information is carried in the common search space; and determine, if no control information is carried in the common search space, a common search space within a time range corresponding to a next symbol group and at a frequency domain location in a frequency domain resource corresponding to the next symbol group, and detect whether control information is carried in the common search space, until the control information is detected or all symbol groups are traversed.

In one embodiment, the symbol is a minimum unit into which a time-frequency resource is divided in time domain.

In one embodiment, the receiver is configured to receive resource location information of the common search space, where the resource location information is transmitted by the network device through higher layer signaling.

In one embodiment, the receiver is configured to receive resource location information of the common search space, where the resource location information is transmitted by the network device in broadcast mode.

In one embodiment, the control information includes downlink control information, and the downlink control information is used to indicate a configuration parameter for uplink and downlink data transmission of the terminal device.

In one embodiment, the downlink control information includes control channel symbol information.

In one embodiment, the receiver is further configured to receive control channel symbol information transmitted by the network device to the terminal device through higher layer signaling.

In one embodiment, the control channel symbol information is at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

In one embodiment, the higher layer signaling is any one of the following:

medium access control-control unit signaling, non-access stratum signaling, radio resource control signaling, packet data convergence protocol signaling, or radio link control signaling.

In one embodiment, the processor is further configured to:

detect whether any control frame format indicator information carried on a physical control format indicator channel exists in all symbols indicated by a maximum quantity of symbols of the current subframe, where the control frame format indicator information is used to indicate the control channel symbol information.

In one embodiment, the processor is further configured to:

detect, in a symbol group on which the control information is detected, based on the control channel symbol information, downlink control information carried in a dedicated search space.

In one embodiment, the processor is further configured to:

detect whether any reference signal exists in all symbols indicated by a maximum quantity of symbols of the current subframe, where the reference signal is used to assist the terminal device in obtaining the control information.

In one embodiment, the processor is further configured to:

detect whether any hybrid automatic repeat request feedback information carried on a physical hybrid automatic repeat request indicator channel exists in all symbols indicated by a maximum quantity of symbols of the current subframe, where the hybrid automatic repeat request feedback information includes a response of the network device to receiving of uplink data from the terminal device.

An embodiment of this application further provides a program. When executed by a processor, the program is configured to perform the resource processing method corresponding to the network device side.

An embodiment of this application further provides a program product, such as a computer-readable storage medium, including the foregoing program.

An embodiment of this application further provides a computer-readable storage medium. The computer-readable storage medium stores an instruction. When run on a computer, the instruction causes the computer to perform the resource processing method corresponding to the network device side.

An embodiment of this application further provides a program. When executed by a processor, the program is configured to perform the resource processing method corresponding to the terminal device side.

An embodiment of this application further provides a program product, such as a computer-readable storage medium, including the foregoing program.

An embodiment of this application further provides a computer-readable storage medium. The computer-readable storage medium stores an instruction. When run on a computer, the instruction causes the computer to perform the resource processing method corresponding to the terminal device side.

DESCRIPTION OF EMBODIMENTS

Figure 1:
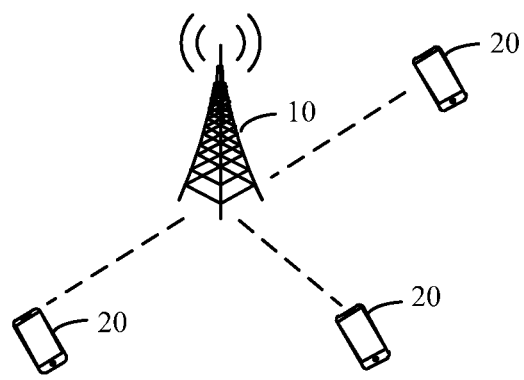
FIG. 1 is a schematic diagram of an embodiment of an applicable network architecture according to an embodiment of this application.

FIG. 1 is a schematic diagram of an embodiment of an applicable network architecture according to an embodiment of this application. As shown in FIG. 1, the network architecture provided in this embodiment includes a network device 10 and at least one terminal device 20.

The network device 10 is a device that enables the terminal device 20 to access a radio network, and may be a base transceiver station (BTS) in Global System for Mobile Communications (GSM) or Code Division Multiple Access (CDMA), or may be a NodeB (NB) in Wideband Code Division Multiple Access (WCDMA), or may be an evolved NodeB (eNB or eNodeB) or a relay station or an access point in Long Term Evolution (LTE), or may be a base station in a future fifth-generation mobile communication (5G) network, or the like. This is not limited herein in this application. FIG. 1 schematically provides a possible example in which the network device 10 is a base station.

The terminal device 20 may be a wireless terminal or a wired terminal. The wireless terminal may be a device that provides a user with voice and/or other service data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, in-computer or in-vehicle mobile apparatus. They exchange voice and/or data with the radio access network. For example, it may be a device such as a personal communication service (PCS) phone, a cordless telephone, a session initiation protocol (SIP) phone set, a wireless local loop (WLL) station, or a personal digital assistant (PDA). The wireless terminal may also be referred to as a system, a subscriber unit), a subscriber station, a mobile station, a mobile console, a remote station, a remote terminal, an access terminal, a user terminal, or a user agent. This is not limited herein in this application. FIG. 1 schematically provides a possible example in which the terminal device 20 is a mobile phone.

In an LTE system or a 5G system, before receiving or transmitting data information, the terminal device 20 needs to learn downlink control information (DCI) that is configured by the network device 10 for the terminal device 20. The DCI is used to indicate how the terminal device performs downlink data reception and uplink data transmission. For example, the DCI may include information such as a resource, a modulation mode, and a code rate used by the terminal device in performing uplink and downlink data transmission. When transmitting the DCI, the network device 10 generally transmits the DCI by adding it to a physical downlink control channel (PDCCH). The implementation of DCI transmission and relevant basic concepts used in this application are described in detail below.

In an LTE system or a 5G system, information occupies an amount of time and bandwidth during transmission, and all time and bandwidths that can be occupied by information are referred to as time-frequency resources. In time domain, a time-frequency resource is divided on a per radio frame basis. Information is transmitted on a per radio frame basis. One radio frame includes 10 subframes, each subframe is 1 millisecond (ms) in length, each subframe includes two slots, and each slot is 0.5 ms. A quantity of symbols included in each slot is related to a length of a cyclic prefix (CP) in a subframe. If a CP is a normal CP, each slot includes 7 symbols, and each subframe includes 14 symbols. For example, each subframe includes symbols numbered #0, #1, #2, #3, #4, #5, #6, #7, #8, #9, #10, #11, #12, and #13 respectively. If a CP is an extended (extended) CP, each slot includes 6 symbols, and each subframe includes 12 symbols. For example, each subframe includes symbols numbered #0, #1, #2, #3, #4, #5, #6, #7, #8, #9, #10, and #11 respectively. In frequency domain, a minimum unit of a time-frequency resource is a subcarrier. Subcarriers distributed in a time range corresponding to a symbol form a frequency domain resource corresponding to the symbol. Frequency domain resources corresponding to all symbols form a time-frequency resource. A resource element (RE) is a minimum unit into which a time-frequency resource is divided, and is uniquely identified by an index pair (k, 1), where k is a subcarrier index and 1 is a symbol index. Certainly, a resource element can also be identified by another form of identifier. Four consecutive REs (excluding a time-frequency resource occupied by a reference signal) form one resource element group (REG). The REs that form the REG may occupy different symbols.

When transmitting the DCI, the network device 10 generally also transmits control format indicator (CFI) information, a reference signal (RS), and hybrid automatic repeat request (HARQ) feedback information, and the like. The information such as DCI, an RS, a CFI, and HARQ feedback information generally occupies the first $N^{th}$ symbols of a subframe during transmission, where for example, N may be 1, 2, or 3. In the following embodiments of this application, the symbols occupied by the information such as the DCI, the RS, the CFI, and the HARQ feedback information are referred to as symbols on which a control channel is located. Frequency domain resources corresponding to all symbols on which a control channel is located form control resources.

For example, the network device 10 can also simultaneously transmit data information within a time range corresponding to symbols on which the control channel is located. In this case, the resource processing methods described in the following embodiments of this application are still applicable, but only time-frequency resources other than the time-frequency resources occupied by the data information are analyzed. In this case, in the frequency domain resources corresponding to all symbols on which the control channel is located, remaining frequency domain resources other than the frequency domain resources occupied by the data information form control resources. Frequency domain resources corresponding to each symbol refer to only remaining frequency domain resources other than the frequency domain resources occupied by the data information. In the following embodiments of this application, the resource processing method provided in this application is described illustratively by using an example in which only the information such as the DCI, the RS, the CFI, and the HARQ feedback information is transmitted in a time range corresponding to the symbols on which the control channel is located.

The CFI is carried on a physical control format indicator channel (PCFICH). The CFI is used to indicate a quantity of symbols occupied when the network device 10 transmits the information such as the CFI, the RS, the DCI, and the HARQ feedback, that is, a total quantity of symbols on which the control channel is located. The value of the CFI may be, for example, any of {1, 2, 3}. After receiving the CFI, the terminal device 20 can determine, based on the CFI, the total quantity of symbols on which the control channel is located, and may determine a start symbol of the data information based on the CFI, that is, determine a symbol from which data information transmission begins in a subframe. The PCFICH carrying the CFI is generally mapped to a frequency domain resource corresponding to the first symbol of the subframe, so that the CFI is transmitted within a time range corresponding to the first symbol of the subframe. Upon receiving the CFI, the terminal device 20 can determine, based on the CFI, the total quantity of symbols on which the control channel is located, and further determine total control resources.

The HARQ feedback information is carried on a physical hybrid automatic repeat request indicator channel (PHICH). The HARQ feedback information is a feedback made by the network device 10 in response to receiving of uplink data that is previously transmitted by the terminal device 20. The PHICH carrying the HARQ feedback information is generally mapped to a frequency domain resource corresponding to the first symbol of the subframe, so that the HARQ feedback information is transmitted within a time range corresponding to the first symbol of the subframe.

The RS is used to help the terminal device 20 perform demodulation to obtain the CFI, the DCI, the HARQ feedback information, and the like that are carried on a channel for transmission. When receiving the RS, the terminal device 20 measures, based on the RS, quality of a channel on which the information is transmitted. The channel quality is used to assist the terminal device in performing demodulation to obtain the information carried on the channel. The RS is generally mapped to a frequency domain resource corresponding to the first symbol of the subframe. One RS occupies at least one RE. A quantity of RSs mapped to a control resource depends on factors such as a quantity of antennas of the network device 10 and identifiers thereof. Herein, the antennas may be antenna ports or actual physical antennas. An antenna port is a logical port used for transmission, and may correspond to one or more actual physical antennas.

In summary, the PCFICH, the PHICH, the RS, and the PDCCH are mapped to control resources. The PCFICH, the PHICH, and the RS occupy some of the control resources, and some or all of remaining control resources may serve as available resources of the PDCCH. A control channel element (CCE) is a minimum unit based on which the PDCCH occupies a control resource. One PDCCH occupies at least one CCE. One CCE includes 9 REGs. The REGs that form a CCE may be distributed on frequency domain resources corresponding to different symbols; or when the REGs that form a CCE are distributed on a frequency domain resource corresponding to a same symbol, the PDCCH can occupy CCEs distributed on the frequency domain resources corresponding to different symbols. Therefore, the PDCCH can occupy the frequency domain resources corresponding to different symbols.

Before receiving the DCI, the terminal device 20 may first determine, based on the CFI, the total quantity of symbols on which the control channel is located, and further determine total control resources. By subtracting the control resources occupied by the RS, the PHICH, and the PCFICH from the total control resources, control resources that can be occupied by the PDCCH, that is, available resources of the PDCCH, can be determined. In the control resources that can be occupied by the PDCCH, two types of search spaces are defined in the LTE system: a common search space and a dedicated search space.

The common search space is a space that all terminal devices 20 in a cell need to monitor. Each terminal device 20 monitors the common search space, and detects whether the common search space carries DCI that the terminal device 20 expects to be carried in the common search space. The DCI carried in the common search space is primarily used to indicate information that is common to all terminal devices 20 in some cells or that is common to a plurality of terminal devices 20, for example, system information and paging information. The common search space includes at least one PDCCH. The DCI carried in the common search space is carried on any of PDCCHs included in the common search space.

Each terminal device 20 monitors its own dedicated search space, and detects whether the dedicated search space carries DCI that the terminal device 20 expects to be carried in the dedicated search space. The DCI carried in the dedicated search space is intended for indicating information pertinent to a terminal device 20, such as downlink resource allocation indication information and uplink scheduling grant information. The dedicated search space also includes at least one PDCCH. The DCI carried in the dedicated search space is also carried on any of PDCCHs included in the dedicated search space.

It should be noted that the PDCCHs included in the common search space may overlap those included in the dedicated search space. In one embodiment, a common PDCCH may belong to both the common search space and the dedicated search space. The network device 10 may set the DCI planned to be carried in the common search space so that the DCI is carried by the common PDCCH, or may set the DCI planned to be carried in the dedicated search space so that the DCI is carried by the common PDCCH. For example, when the terminal device 20 receives DCI, the terminal device 20 needs to detect, when detecting the common search space, whether the common PDCCH carries the DCI. If the common PDCCH already carries the DCI, the terminal device 20 does not need to detect the common PDCCH when detecting the dedicated search space. If the common PDCCH does not carry the DCI, the terminal device 20 further needs to detect, when detecting the dedicated search space, whether the common PDCCH carries the DCI. In one embodiment, the network device 20 may also directly detect all PDCCHs included in the dedicated search space. In one embodiment, there may be a plurality of common PDCCHs.

In the LTE system, the common search space includes 16 CCEs, and it is specified that there are only two aggregation levels (AL) of the CCEs in the common search space: 4 and 8. The aggregation level is used to indicate a quantity of CCEs in the common search space that are used as a unit to carry information, that is, indicate a quantity of CCEs occupied by a PDCCH. For example, when the AL is set to 8, a PDCCH includes eight CCEs, a common search space may include two PDCCHs, and the two PDCCHs occupy CCEs numbered 0 to 7 and CCEs numbered 8 to 15, respectively. When searching the common search space, the terminal device 20 is unaware of the AL of the common search space, and therefore, needs to search the common search space by using 4 CCEs as a unit and using 8 CCEs as a unit separately. When it is considered that the AL is 8, a cyclic redundancy check (CRC) needs to be performed only on the CCEs numbered 0 to 7 and on the CCEs numbered 8 to 15. When it is considered that the AL is 4, a CRC needs to be performed only on the CCEs numbered 0 to 3, the CCEs numbered 4 to 7, the CCEs numbered 8 to 11, and the CCEs numbered 12 to 15 separately. This process may be referred to as a blind detection process of the terminal device 20. The terminal device 20 can finish searching the common search space by performing the CRC for 6 times at most.

The aggregation level of the dedicated search space may be any of 1, 2, 4, or 8, and a corresponding total quantity of CCEs of the dedicated search space is 6, 12, 8, or 16 respectively. Referring to the foregoing calculation of a blind detection workload in the common search space, it can be learned that, to obtain the DCI information carried in the dedicated search space, the terminal device 20 needs to perform blind detection for (6/1+12/2+8/4+16/8)=16 times at most. A dedicated search space may also include at least one PDCCH. A quantity of CCEs occupied by a PDCCH depends on the aggregation level.

Therefore, in the LTE system, the control resources that can be occupied by the PDCCH include a common search space and a dedicated search space that corresponds to each terminal device 20.

The CRC check process is as follows:

When receiving the DCI, the terminal device 20 learns a current state of the terminal device 20 and the DCI information that the terminal device 20 expects to receive in the state. For example, when the terminal device 20 is in an idle state, the DCI information that the terminal device 20 expects to receive is paging information (Paging); after the terminal device 20 initiates a random access request, the DCI information that the terminal device 20 expects to receive is random access channel response information (RACH Response); when there is uplink data to be transmitted, the DCI information that the terminal device 20 expects to receive is an uplink scheduling grant, and the like. For different expected information, the terminal device 20 performs a CRC check based on the foregoing blind detection manner by using a corresponding X-RNTI (radio network temporary identifier), where X indicates a type of information that the terminal device 20 expects to receive. For example, when the terminal device 20 expects to receive an RACH Response (RA), the terminal device performs a CRC check by using an RA-RNTI. If the CRC check is successful, the terminal device 20 can determine that the current DCI information is expected by the terminal device 20, and learn a corresponding DCI format, thereby further obtaining content indicated in the DCI information. When the DCI that the terminal device 20 expects to receive is carried in a common search space, an RNTI of a user group (a cell or an intra-cell group) nature, such as an RA-RNTI is used as the DCI. When the terminal device 20 expects to receive the DCI carried in a dedicated search space, an identifier of the terminal device 20 may be used as X.

Figure 2:
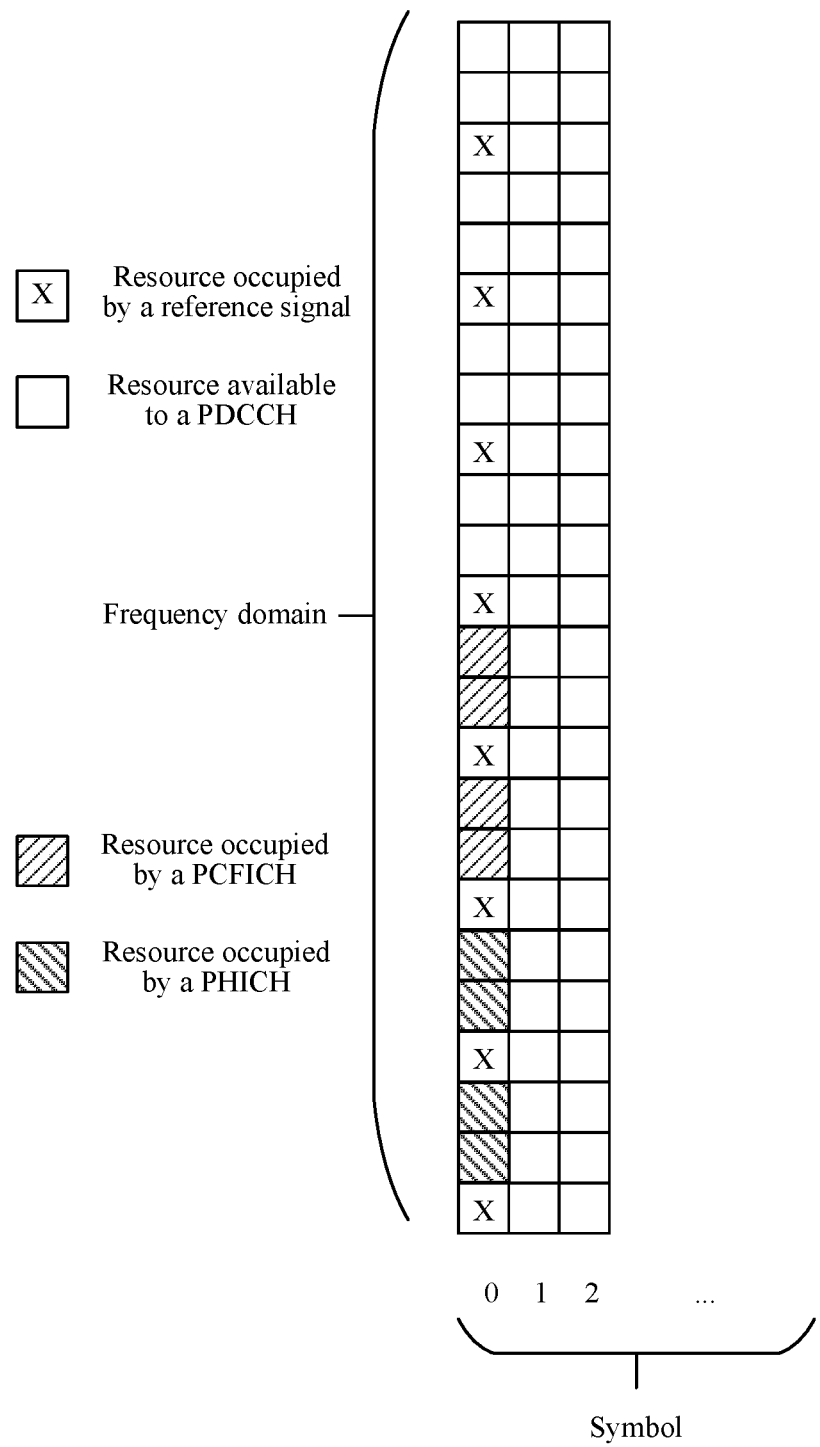
FIG. 2 is a schematic diagram of a control resource mapping structure in a communications system.

With respect to the foregoing description, a DCI transmission method is outlined below. FIG. 2 is a schematic diagram of a control resource mapping structure in a communications system.

FIG. 2 schematically shows a control resource mapping structure in a communications system, where a horizontal axis direction denotes a time domain, a small square represents a symbol in time domain, a vertical axis direction denotes a frequency domain, and a frequency domain resource corresponding to a symbol depends on a system bandwidth. In FIG. 2, the vertical axis direction merely divides the frequency domain schematically, and shows only some frequency domain resources. As shown in FIG. 2, a reference signal RS, a PCFICH carrying the CFI, and a PHICH are all mapped to a frequency domain resource corresponding to the first symbol of a subframe. Available resources of the PDCCH are distributed on different symbols, and with reference to FIG. 2, distributed on 3 symbols. Therefore, the common search space may also be distributed on frequency domain resources corresponding to the 3 symbols.

For example, the receiving the DCI by the terminal device 20 based on the foregoing control resource mapping relationship includes the following operations.

S201. The terminal device 20 receives an RS, HARQ feedback information carried on a PHICH, and a CFI carried on the PCFICH.

S202. The terminal device 20 obtains an index of a CCE based on the CFI and information about resources occupied by the PCFICH, the RS, and the PHICH.

In one embodiment, the terminal device 20 first calculates, based on a system bandwidth and a value of the CFI, a quantity of available REGs $N_{REG,L}$ corresponding to a symbol on which a control channel is located in the $L^{th}$ subframe, that is, a total quantity of control resources of the subframe. Then, the quantity of REGs occupied by the PCFICH and the PHICH is subtracted from $N_{REG,L}$ to obtain a quantity of available CCEs of the PDCCH in the $L^{th}$ subframe, that is, $N_{REG,L}=[N_{REG,L}/9]$, where L is a positive integer greater than 0, and [*] indicates rounding * down to the nearest integer. The terminal device 20 can obtain, based on $N_{REG,L}$ and an agreement in an LTE protocol, an index of an available CCE of the PDCCH, that is, a serial number of each CCE in $N_{REG,L}$.

S203. The terminal device 20 performs blind detection in the common search space of the $L^{th}$ subframe based on the indexes of CCEs, and obtains DCI carried in the common search space.

In one embodiment, the terminal device 20 determines, based on the indexes of CCEs and the agreement in the LTE protocol, serial numbers of the 16 CCEs occupied by the common search space, and then performs blind detection in the 16 CCEs for 6 times at most to obtain the DCI carried in the common search space.

S204. After the blind detection succeeds, the terminal device 20 performs blind detection in a dedicated search space to obtain DCI carried in the dedicated search space.

In one embodiment, the terminal device 20 determines a serial number of a start CCE of the dedicated search space based on the indexes of CCEs and the agreement in the LTE protocol, and then, by starting from this CCE, performs blind detection for 16 times at most to obtain the DCI carried in the dedicated search space. For example, when AL=2, a corresponding total quantity of CCEs of a dedicated search space is 12. Then, starting from the CCE numbered n, the CCEs numbered n to n+11 are searched to check whether DCI carried in the dedicated search space exists. Moreover, in the search process, the CCEs numbered n and n+1 are aggregated into one search unit, the CCEs numbered n+2 and n+3 are aggregated into one search unit, the CCEs numbered n+4 and n+5 are aggregated into one search unit, and so on. Search is performed 6 times in total when AL=2, where n is a non-negative integer.

After obtaining the DCI carried in the common search space and the dedicated search space, the terminal device 20 can receive and/or transmit data information based on the received DCI.

Beamforming is a technology for achieving a higher gain of an antenna array by controlling an RF link to transmit a beam spatially in a direction. The beamforming technology can reduce a loss in high-frequency communication transmission and is a development trend of a future communications system. In the beamforming technology, beams transmitted by one RF link at a same time point can face only one direction. In one embodiment, an RF link cannot transmit beams in two directions at a same time point. The following embodiments of this application describe only an example in which a symbol is a minimum time unit. In one embodiment, an RF link cannot transmit beams in two directions within a time range corresponding to a same symbol. The following embodiments of this application are still applicable when the minimum time unit changes.

The terminal device 20 may be located in any direction of the network device 10, and the network device 10 generally needs to serve a plurality of terminal devices 20 distributed in different directions, for example, to transmit DCI to all terminal devices 20 within a cell. However, in an LTE system, a common search space is specified only in the time-frequency resource. Moreover, the common search space may be distributed across symbols. In one embodiment, CCEs that form the common search space are distributed on frequency domain resources corresponding to different symbols. REGs that form a CCE may also be distributed on frequency domain resources corresponding to different symbols. Therefore, DCI carried in the common search space may be distributed on frequency domain resources corresponding to different symbols.

When all RF links transmit a beam in a first direction within a time range corresponding to one subframe, only a terminal device 20 in the first direction can successfully detect the common search space, and terminal devices 20 in other directions cannot detect the common search space. Further, even if there are a plurality of RF links and each RF link faces a different direction, a quantity of RF links of the network device is much smaller than a quantity of possible directions of the terminal devices, and the terminal devices 20 in some directions still cannot detect the common search space.

When an RF link transmits beams in different directions within a time range corresponding to one subframe, because the common search space is distributed across symbols and the DCI carried in the common search space may be distributed on frequency domain resources corresponding to different symbols, each terminal device 20 distributed in a different direction may be unable to detect a complete common search space, thereby resulting in failure to receive the DCI carried in the common search space.

For example, referring to FIG. 2, when an RF link of the network device 10 keeps a consistent beam transmission direction in a time range corresponding to symbols #0, #1, and #2, only a terminal device 20 located in this transmission direction may detect the common search space and a dedicated search space. When the RF link changes the beam transmission direction within the time range corresponding to the symbols #0, #1, and #2, because resources occupied by the common search space are generally distributed on frequency domain resources corresponding to the symbols #0, #1, and #2, no terminal device 20 can correctly detect the common search space.

Therefore, when the beamforming technology is applied to the LTE system, when the terminal devices 20 are distributed in different directions, there is a problem that terminal devices in some directions cannot detect the common search space, and cannot receive the DCI carried in the common search space.

If the beamforming technology is combined with a 5G system, because no common search space is set in a 5G system and instead a dedicated search space is set for each terminal device 20, a separate dedicated search space needs to be set for each terminal device 20 when common information needs to be notified to a plurality of terminal devices 20. In the 5G system, a dedicated search space occupies very high overheads of control resources.

To resolve the foregoing problem and enable the terminal devices 20 in a plurality of directions to detect the common search space in a time range corresponding to one subframe, an embodiment of this application provides a resource processing method. The resource processing method provided in the embodiment of this application is described in detail below.

Figure 3:
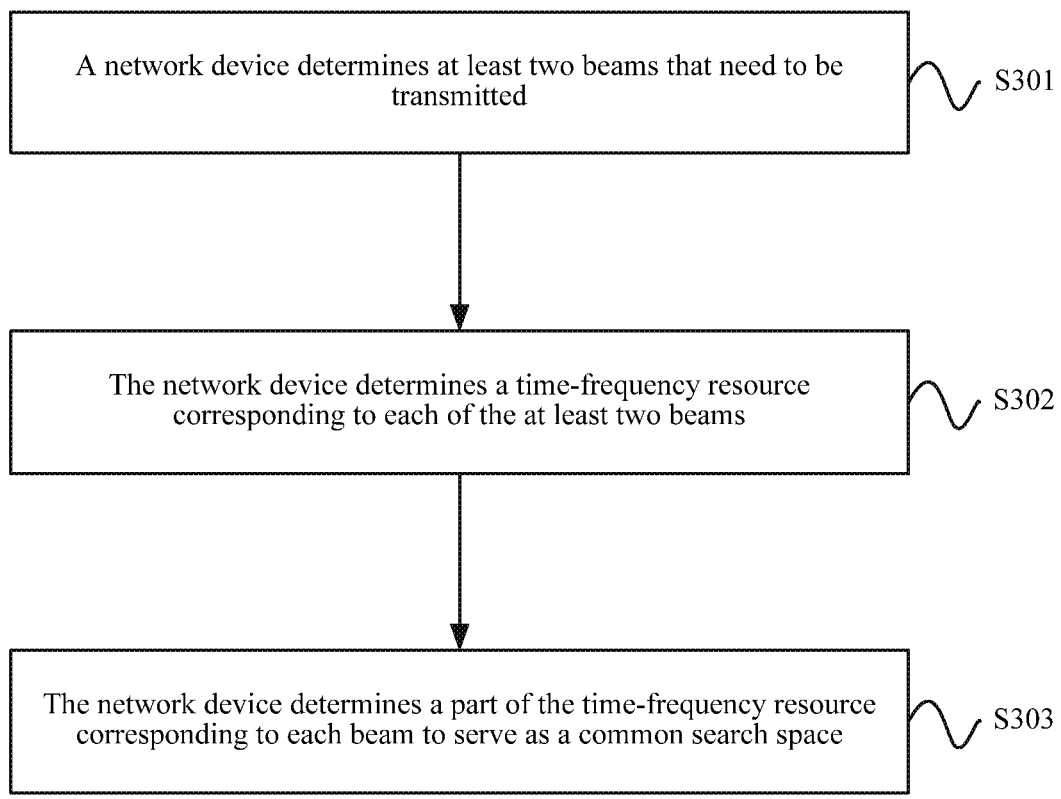
FIG. 3 is a schematic flowchart of a resource processing method according to an embodiment of this application.

FIG. 3 is a schematic flowchart of a resource processing method according to an embodiment of this application. In this embodiment, a common search space is allocated to a terminal device in a direction corresponding to each beam in resource allocation. As shown in FIG. 3, the method includes the following operations.

S301. A network device determines at least two beams that need to be transmitted.

For example, when a network device 10 needs to transmit control information to a terminal device 20, the network device 10 determines at least two beams that need to be transmitted. In one embodiment, the network device 10 may determine, based on control information that needs to be transmitted, a quantity of beams that need to be transmitted. For example, when the network device 10 needs to page all idle terminal devices 20 in a serving cell, because the network device 10 is unaware of a direction of the terminal device 20, the network device 10 needs to transmit beams in all possible directions. Further, when the quantity of beams that need to be transmitted is relatively large, the network device 10 may further determine to transmit the beams within a time range corresponding to different subframes. The beams that need to be transmitted can be transmitted alternately by transmitting the beams in a plurality of subframes separately. To further increase an alternating speed of transmitting control information by the network device 10, it is generally specified that one beam corresponds to one symbol.

In one embodiment, the network device 10 may further determine, based on directions of terminal devices 20 that need to be served, the quantity of beams that need to be transmitted. When the network device 10 is aware of the directions of the terminal devices 20 that need to be served, the network devices 10 can determine, based on the directions of the terminal devices 20, beams that need to be transmitted. When the quantity of directions of the terminal devices is relatively small, a symbol group may be allocated to a beam. A symbol group may include at least one symbol.

In one embodiment, the quantity of beams that need to be transmitted may further be determined based on a beam width. For example, when the width of a beam to be transmitted by the network device 10 is large, that is, the beam has a relatively large coverage angle, the network device 10 can cover all possible directions by transmitting only a small quantity of beams. Similarly, a symbol group may be allocated to a beam, and one symbol group may include at least one symbol.

In one embodiment, the network device 10 may further determine, based on other configurations, the beams that need to be transmitted. This is not limited in this application.

S302. The network device determines a time-frequency resource corresponding to each of the at least two beams.

For example, the network device determines a corresponding time-frequency resource for each beam. In one embodiment, the network device may determine a corresponding time-frequency resource by determining a corresponding symbol group for each beam. Frequency domain resources corresponding to all symbols in a symbol group form a time-frequency resource of the beam corresponding to the symbol group. One symbol group may include at least one symbol. In one embodiment, by determining a corresponding symbol for each beam, the network device determines that a time-frequency resource corresponding to each beam is a frequency domain resource corresponding to the symbol corresponding to each beam. After determining the corresponding symbol group or symbol for each beam, the network device 10 transmits the corresponding beam within a time range corresponding to the symbol group or symbol, so that the terminal devices 20 in the direction corresponding to the beam can receive the beam.

S303. The network device determines a part of the time-frequency resource corresponding to each beam to serve as a common search space.

The part that corresponds to the common search space and that is of the time-frequency resource is used to carry control information transmitted to the terminal device.

For example, the network device 10 selects a part of the time-frequency resource from the time-frequency resource corresponding to each beam. For example, some CCEs may be selected as the part of the time-frequency resource from all available CCEs included in the time-frequency resource. The CCEs form a common search space, and may be used to carry control information transmitted by the network device 10 to the terminal device 20. The quantity of CCEs may be determined based on control information to be transmitted. That is, the time-frequency resource corresponding to each beam includes a common search space, and the common search space included in the time-frequency resource corresponding to each beam can carry the control information.

The embodiment of this application provides a resource processing method. A time-frequency resource is allocated to each beam after the at least two beams that need to be transmitted are determined. A time-frequency resource is determined in the time-frequency resource corresponding to each beam to serve as the common search space. The resource processing method provided in the embodiment of this application ensures that all terminal devices can detect a complete common search space when the terminal devices are distributed in different directions. In addition, because the network device 10 has transmitted at least two beams within the time range corresponding to one subframe, so that the network device 10 can transmit more beams in one subframe without increasing RF links, thereby expanding coverage.

Further, in the embodiment of the resource processing method, when the network device 10 needs to simultaneously transmit control information to the terminal devices 20 distributed in a plurality of directions, the network device 10 determines beams that need to be transmitted in each subframe. The network device 10 adds control information to the common search space in the time-frequency resource corresponding to each beam, that is, reproduces the control information, so that each beam carries the control information. The control information is information that a plurality of terminal devices 10 need to receive, for example, downlink control information that needs to be carried in the common search space. Therefore, the terminal devices 20 in the directions corresponding to the beams can detect the common search space, and then can receive the control information carried in the common search space.

With reference to the foregoing resource processing method, the following describes in detail a process of mapping the DCI carried in the common search space to the time-frequency resource when the network device 10 transmits the DCI carried in the common search space. For example, a physical layer process of mapping the DCI to the time-frequency resource may include the following operations.

S001: The network device obtains DCI that needs to be mapped to the time-frequency resource, where the DCI is a binary bit stream.

S002: Add CRC check bits to the DCI bit stream.

For example, the network device adds a CRC check bit to the DCI bit stream, where a CRC check bit length may be determined by referring to a protocol in the LTE system.

S003: Perform channel coding on the DCI to which the CRC check bit has been added, to obtain encoded data.

The channel coding process may be performed by using tail-biting convolutional coding (Tail-biting convolutional coding, TBCC code), polar code (Polar code), or any coding mode in the LTE system. This is not limited in this application. The channel coding is used to provide error detection and error correction capabilities for information transmission.

S004: Perform rate matching on encoded data to obtain a bit sequence to be transmitted.

For example, the rate matching is used to select, from the encoded data, a bit sequence that really needs to be transmitted.

S005: Determine CCEs corresponding to each bit sequence.

For example, a bit sequence may be transmitted in an aggregate manner on a plurality of CCEs. A quantity of the CCEs is an aggregation level. For example, the aggregation level may be {1, 2, 4, 8}.

S006: Integrate a plurality of bit sequences to be transmitted, to obtain a multiplexed bit sequence.

For example, a length of the $i^{th}$ bit sequence $b^{(i)}$ is marked as $M^{(i)}$, and the bit sequence is denoted by $b^{(i)}(0), \ldots, b^{(i)}(M^{(i)}-1)$, where i is a non-negative integer. Therefore, a bit sequence to which P bit sequences are integrated may be denoted by $b^{(0)}(0), \ldots, b^{(0)}(M^{(0)}-1), \ldots, b^{(P-1)}(M^{P-1}-1$. In this application, this sequence is defined as a multiplexed bit sequence. A total length of the multiplexed bit sequence is $M_{tot}=8N_{REG}\geq\Sigma_{i=0}^{P-1}M^{(i)}$, where $N_{REG}$ indicates a total quantity of control resources in the time-frequency resource.

Adaptively, CCEs corresponding to each piece of bit data can be determined by means of the foregoing integration.

S007: Scramble the multiplexed bit sequence obtained in S006, to obtain scrambled data.

For example, the scrambling refers to performing an addition modulo 2 operation on the multiplexed bit stream by using a sequence (for example, using a sequence associated with a cell identifier), to randomize interference between neighboring cells.

S008: Modulate the scrambled data to obtain a QPSK symbol sequence or a QAM symbol sequence.

For example, a quadrature phase shift keying (QPSK) modulation mode may be applied to the obtained scrambled data. In one embodiment, 2 bits are modulated into one QPSK symbol. For example, if a quadrature amplitude modulation (QAM) mode is applied, the scrambled data is modulated into a QAM symbol sequence. In one embodiment, other modulation modes may be applied. This is not limited in this application.

S009: Performing interleaving and cyclic shifting on the QPSK symbol sequence or the QAM symbol sequence.

S010: Map the QPSK symbol or the QAM symbol to an antenna port and a physical time-frequency resource based on a mapping relationship between the QPSK symbol sequence or the QAM symbol sequence and an RE.

For example, the mapping relationship between each QPSK symbol or each QAM symbol and the RE can be obtained based on a correspondence between the CCE and each piece of bit data, a correspondence between each piece of bit data and each QPSK symbol or each QAM symbol, and the mapping relationship between the RE and the CCE.

Generally, in performing DCI mapping in the LTE system, each QPSK symbol or each QAM symbol is preferentially sequentially mapped to an RE with a same subcarrier but different symbols. In one embodiment, the DCI is distributed on frequency domain resources corresponding to different symbols, and the DCI is mapped only once. Therefore, when the terminal devices 20 are distributed over different symbols, there is the problem that the terminal devices in some directions cannot receive the DCI carried in the common search space.

In the embodiment of this application, after the network device 10 determines the at least two beams that need to be transmitted and the time-frequency resource corresponding to each beam, the network device 10 maps the QPSK symbol sequence or the QAM symbol sequence to the common search space in the time-frequency resource corresponding to each beam. In one embodiment, when one beam corresponds to one symbol, each QPSK symbol or each QAM symbol is sequentially mapped to an RE with the same symbol but different subcarriers by starting from a first RE of the common search space corresponding to the symbol. In one embodiment, when one beam corresponds to one symbol group, in an example in which a symbol group includes two symbols, each QPSK symbol or each QAM symbol may be preferentially sequentially mapped to the RE with the same symbol but different subcarriers by starting from the first RE of the common search space corresponding to the symbol. When the quantity of REs in the frequency domain resource corresponding to one symbol is insufficient, the QPSK symbol or the QAM symbol is mapped to REs in a frequency domain resource corresponding to the second symbol; or each QPSK symbol or each QAM symbol may be preferentially sequentially mapped to REs with the same subcarrier but different symbols. After completion of mapping the QPSK symbol sequence or the QAM symbol sequence corresponding to one beam, the QPSK symbol sequence or the QAM symbol sequence is mapped to the time-frequency resource corresponding to a second beam, until completion of mapping QPSK symbol sequences or QAM symbol sequences to common search spaces in time-frequency resources corresponding to all beams.

In the embodiment of this application, a copy of DCI is mapped to a time-frequency resource corresponding to each beam, thereby ensuring that the terminal devices in the directions corresponding to the beams can receive the DCI.

S011: Perform an inverse Fourier transformation on a mapping result.

For example, through the inverse Fourier transformation, QPSK symbols on all subcarriers can be modulated into waveforms for transmission, thereby implementing transmission of binary DCI in the LTE system.

Correspondingly, when the terminal device 20 receives the DCI, the receiving process includes, for example, an operation opposite to the foregoing mapping process. A physical layer process of receiving the DCI by the terminal device primarily includes:

performing, by the terminal device 20, operations such as Fourier transformation, deinterleaving, cyclic shift, demodulation, and descrambling on the received waveform to obtain a resource mapping structure shown in FIG. 2; and performing, by the terminal device 20, blind detection of the common search space in the received resource mapping structure to obtain downlink control information.

The resource processing method provided in this application is described in detail below with reference to a plurality of embodiments of DCI transmission.

Figure 4:
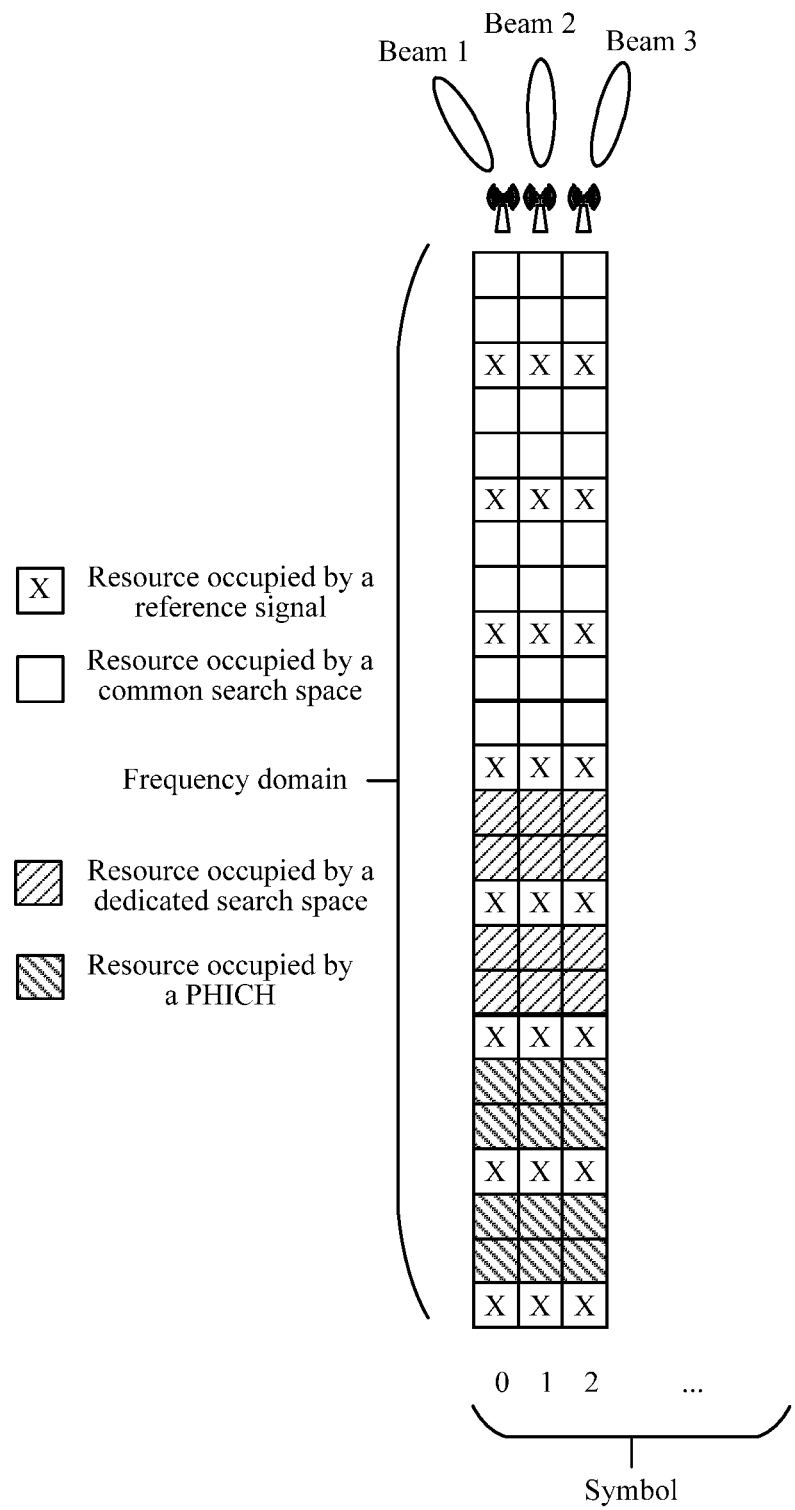
FIG. 4 is a schematic diagram of a control resource mapping structure according to an embodiment of this application.

FIG. 4 is a schematic diagram of a control resource mapping structure according to one embodiment of this application. As shown in FIG. 4, three beams need to be transmitted in this embodiment. In one embodiment, the resource processing method in this embodiment is described by using an example in which the network device 10 needs to simultaneously serve terminal devices 20 in directions corresponding to three different beams. A quantity of terminal devices 20 in a direction corresponding to each beam may be the same or different. Referring to FIG. 4, an embodiment of this application provides a resource processing method, including the following operations.

S401: A network device determines beams that need to be transmitted, and determines a part of a frequency domain resource corresponding to each beam to serve as a common search space.

For example, when transmitting information through a radio frequency (RF) link, after determining the beam that needs to be transmitted, the network device 10 allocates a corresponding symbol to each beam. Within a time range corresponding to a symbol, the network device 10 controls an RF link to transmit a beam corresponding to the symbol, so that a terminal device 20 in a direction corresponding to a beam corresponding to the symbol can receive information transmitted by the network device 10 within the time range corresponding to the symbol. In this embodiment, after determining three beams, the network device 10 determines corresponding time-frequency resources for the three beams separately. As shown in FIG. 4, the time-frequency resource corresponding to a beam is a frequency domain resource corresponding to the symbol corresponding to the beam. On the frequency domain resource, the network device 10 further determines a part of the frequency domain resource to serve as a common search space for each beam. As shown in FIG. 4, a part that is occupied by each common search space and that is of the frequency domain resource is located at a same location on different symbols. To distribute a common search space on a frequency domain resource corresponding to only one symbol, a plurality of CCEs that form the common search space in the embodiment are distributed on a frequency domain resource corresponding to a same symbol. In one embodiment, CCEs distributed on the frequency domain resource corresponding to the same symbol are selected for the common search space, and REGs that form each CCE are distributed on the frequency domain resource corresponding to the same symbol.

S402: The network device maps DCI to the common search space.

For example, the network device 10 transmits the DCI to the terminal device 20. When the DCI is common to at least one terminal device in a cell, such as system information or paging information, the network device 10 maps one piece of DCI to each common search space, to ensure that all terminal devices 20 in directions corresponding to the three beams can receive the DCI carried in the common search space.

For example, when the network device 10 does not need to transmit, to the terminal device 20, the DCI carried in the common search space, and transmits only DCI corresponding to a terminal device, the network device 10 can also map, to each common search space, the DCI corresponding to the terminal device. In this case, to ensure that the terminal device 20 can detect the DCI, the network device 10 may use higher layer signaling to notify the terminal device of location information of a resource occupied by the DCI, and an identifier required for performing a CRC check, so that the terminal device receives the DCI based on the resource location information and the identifier.

In one embodiment, on the frequency domain resource corresponding to the symbol corresponding to each beam, the network device 10 further determines a part of the frequency domain resource for mapping an RS and/or a part of the frequency domain resource for mapping HARQ feedback information. No overlap exists between the part that corresponds to the common search space and that is of the frequency domain resource, the part of the frequency domain resource for mapping the RS, and the part of the frequency domain resource for mapping the HARQ feedback information. In one embodiment, the frequency domain resource corresponding to the symbol corresponding to each beam carries at least one RS. The RS and the HARQ feedback information are mapped to the frequency domain resource corresponding to each beam, so that the terminal device 20 in the direction corresponding to each beam can successfully receive the RS and the HARQ feedback information. In the LTE system, the RS and the HARQ feedback information are generally mapped to only the frequency domain resource corresponding to the first symbol in a subframe, and only the terminal device 20 in the direction corresponding to the beam corresponding to the first symbol can receive the RS and the HARQ feedback information. By contrast, this embodiment avoids the following problem: the terminal devices 20 distributed in directions corresponding to other symbols cannot receive the DCI due to failure to receive the RS and the HARQ feedback information.

In one embodiment of this application, the network device 10 further determines a part of the frequency domain resource corresponding to the symbol corresponding to each beam to serve as a dedicated search space. The network device 10 adds DCI allocated to each terminal device 20 separately to a dedicated search space on a frequency domain resource corresponding to a beam corresponding to a direction of each terminal device separately. No overlap exists between the part that corresponds to the dedicated search space and that is of the frequency domain resource, the part of the frequency domain resource for mapping the RS, and the part of the frequency domain resource for mapping the HARQ feedback information. For example, the part that corresponds to the dedicated search space and that is of the time-frequency resource may overlap the part that corresponds to the common search space and that is of the time-frequency resource. The overlap is referred to as an overlapped resource. In a mapping process, the network device 10 may map, to the overlapped resource, the DCI carried in the common search space or the DCI carried in the dedicated search space.

S403. The network device 10 transmits the resource location information of the common search space to the terminal device 20.

Different from a control resource mapping structure in the LTE system, no PCFICH is mapped to the control resource in this embodiment. Due to failure to receive the CFI carried on the PCFICH, the terminal device 20 cannot obtain the resource location information of the common search space by calculating the indexes of the CCEs according to the method described in operation S202 above. To resolve the foregoing problem, in this embodiment, the network device 10 directly transmits the resource location information of the common search space to the terminal device 20.

For example, the terminal device 20 obtains, through a higher layer signaling configuration, REG or CCE location information of the common search space corresponding to each symbol. In one embodiment, when initially accessing a network, the terminal device 20 may receive the resource location information of the common search space, where the resource location information is transmitted by the network device 10 in broadcast mode.

The higher layer signaling may be, for example, media access control-control unit (MAC-CE) signaling, non-access stratum (NAS) signaling, radio resource control (RRC) signaling, packet data convergence protocol (PDCP) signaling, or radio link control (RLC) signaling.

In one embodiment, the terminal device 20 may obtain the information about a resource location that is on the frequency domain resource corresponding to each symbol and that is occupied by the common search space corresponding to each symbol. For example, the terminal device 20 receives symbol information and frequency domain resource information of resources occupied by each common search space, and the frequency domain resource information may be, for example, subcarrier information. In one embodiment, the terminal device 20 may obtain a piece of resource location information and use it as resource location information of a common search space corresponding to each symbol. In this case, common search spaces on frequency domain resources corresponding to different symbols occupy a consistent resource location. Signaling overheads can be reduced by setting the common search spaces on the frequency domain resources corresponding to different symbols to the same location. For example, the terminal device 20 receives subcarrier information of the resource occupied by each common search space. The signaling overheads can be further reduced when all resource locations of the common search spaces on the frequency domain resources corresponding to symbols in different subframes are the same. In one embodiment, the resource location information received by the terminal device 20 may be information about a first resource location occupied by the common search space corresponding to the first symbol, and an offset between the information about the first resource location and information about a resource location occupied by a common search space corresponding to another symbol. Alternatively, the resource location information received by the terminal device 20 may be information about a first resource location occupied by the common search space corresponding to the first symbol, and an association relationship between information about a resource location occupied by a common search space corresponding to a next symbol and information about a resource location occupied by a common search space corresponding to a previous symbol, where the association relationship may be an offset.

For example, the resource location information of the common search space may include the following implementations.

In one embodiment, the network device 10 directly notifies the terminal device 20 of the information about the resource location occupied by the common search space on the frequency domain resource corresponding to each symbol. The resource location information of the common search space is location information of CCEs or REGs occupied by the common search space. In this case, the common search space may occupy 16 CCEs in the same way as in an LTE protocol, and an aggregation level can be 4 or 8. By performing blind detection for 6 times at most based on the location information of the CCEs, the terminal device 20 obtains the DCI carried in the common search space. The common search space may occupy other quantities of CCEs depending on actual requirements, and other aggregation levels may be set. This is not limited in this application. By directly transmitting the resource location information of the common search space to the terminal device, the terminal device can directly determine the common search space based on the resource location information without calculating a location of the common search space, thereby reducing a workload of the terminal device, and increasing a speed of the terminal device in receiving the control information carried in the common search space.

In another embodiment, the network device 10 may directly transmit resource location information occupied by a PDCCH on a frequency domain resource corresponding to each symbol to the terminal device 20, where the PDCCH is occupied in the common search space by the DCI carried in the common search space. The resource location information of the common search space is location information of REGs or CCEs occupied by the common search space. Therefore, different from the common search space in the LTE system, the quantity of CCEs occupied by the common search space in this embodiment may not be 16, and may be adaptively set based on the DCI carried in the common search space. In addition, an aggregation level is no longer set for the common search space in this embodiment. The terminal device 20 can directly perform a CRC check based on the location information of REGs or CCEs and obtain the DCI carried in the PDCCH without performing blind detection, thereby reducing the quantity of times of blind detection by the terminal device and reducing complexity of DCI detection.

It should be noted that when the resource location information configured by the network device 10 for all common search spaces in different subframes is consistent, the network device 10 may transmit the resource location information of the common search space only once. In this case, operation S403 may alternatively be performed before operation S401.

S404. Based on the received resource location information of the common search space, the terminal device 20 obtains the DCI carried in the common search space.

For example, based on the received resource location information and by starting from a first symbol of a current subframe, the terminal device 20 determines a common search space at a location that is on a frequency domain resource corresponding to the first symbol and that is indicated by the resource location information, and attempts to detect whether any DCI is carried in the common search space. When the terminal device 20 is located in a direction corresponding to a beam transmitted by the network device 10 on the first symbol, and the common search space corresponding to the symbol carries the DCI of the terminal device 20, the terminal device 20 can receive the DCI carried in the common search space. When detecting the DCI carried in the common search space, the terminal device 20 stops attempting to detect the DCI carried in the common search space. When the terminal device 20 detects, in a time range corresponding to the first symbol, no DCI carried in the common search space, the terminal device 20 continues to attempt to detect, on a frequency domain resource corresponding to a second symbol and based on the resource location information, the DCI carried in the common search space. A maximum quantity of symbols is preset in the terminal device 20. The maximum quantity of symbols may be configured in the terminal device 20 during manufacturing of the terminal device 20, or may be configured by the network device 10 for the terminal device 20 through higher layer signaling, or may be transmitted by the network device 10 in broadcast mode when the terminal device 20 initially accesses a network. When the terminal device 20 detects, within a time range corresponding to all symbols included in the maximum quantity of symbols, no DCI carried in the common search space, the terminal device 20 stops detecting the DCI carried in the common search space.

In one embodiment, the common search space corresponding to each symbol further carries control channel symbol information. The control channel symbol information is used to indicate a quantity of symbols required for the network device 10 to transmit the RS, the DCI, and the HARQ feedback information, that is, a total quantity of symbols on which a control channel is located. For example, the control channel symbol information may be CFI information in the LTE system. For example, the control channel symbol information may be used as a new field of the DCI and carried on a PDCCH.

For example, the control channel symbol information may be at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

In the control channel symbol information, a quantity indicated is not greater than the maximum quantity of symbols except the number of a start symbol of a data channel. The data channel indicates a time-frequency resource occupied by the network device 10 in transmitting data information.

The total quantity of control channel symbols is used to indicate a quantity of symbols occupied by the network device 10 to transmit the RS, the DCI, and the HARQ feedback information. In one embodiment, after receiving the total quantity M of control channel symbols, the terminal device 20 searches for the DCI on frequency domain resources corresponding to the first M symbols of a current subframe, and starts receiving data information from the $(M+1)^{th}$ symbol of the current subframe, where M is a positive integer greater than 0.

The quantity of remaining control channel symbols is used to indicate, a quantity of symbols that are counted from the current symbol and that still need to be occupied by the network device 10 to transmit the RS, the DCI, and the HARQ feedback information. In one embodiment, after receiving the total quantity M of control channel symbols, the terminal device 20 searches for the DCI on frequency domain resources corresponding to the first M symbols of a current subframe, and starts receiving data information from the $(M+1)^{th}$ symbol of the current subframe.

The total quantity of control channel symbols in a current subframe is used to indicate a quantity of symbols occupied by the network device 10 in the current subframe to transmit the RS, the DCI, and the HARQ feedback information.

The quantity of remaining control channel symbols in the current subframe is used to indicate a quantity of symbols that are counted from the current symbol and that still need to be occupied by the network device 10 in the current subframe to transmit the RS, the DCI, and the HARQ feedback information.

The total quantity of control channel symbols on a current beam is used to indicate a quantity of symbols occupied by the network device 10 on the current beam to transmit the RS, the DCI, and the HARQ feedback information. In this embodiment, on each beam, the network device 10 occupies only one symbol to transmit the RS, the DCI, and the HARQ feedback information.

The quantity of remaining control channel symbols on the current beam is used to indicate a quantity of symbols that are counted from the current symbol and that still need to be occupied by the network device 10 on the current beam to transmit the RS, the DCI, and the HARQ feedback information. In this embodiment, on each beam, the network device 10 occupies only one symbol to transmit the RS, the DCI, and the HARQ feedback information. Therefore, a value of the quantity of remaining control channel symbols on the current beam is 0.

The number of a start symbol of a data channel is used to indicate a symbol from which the terminal device 20 starts receiving data information in the current subframe.

For example, when the frequency domain resource corresponding to a symbol carries both DCI and data information, the control channel symbol information needs to both indicate the symbols occupied by the network device 10 to transmit the RS, the DCI, and the HARQ feedback information and indicate the symbols occupied to transmit the data information.

For example, referring to FIG. 4, after detecting the DCI on the symbol #0, the terminal device 20 can receive the control channel symbol information concurrently. When the control channel symbol information is the total quantity of control channel symbols, for example, the total quantity of control channel symbols is 3, it indicates that the network device 10 needs to occupy a total of 3 symbols in the current subframe to transmit the RS, the DCI, and the HARQ feedback information. When the control channel symbol information is the quantity of remaining control channel symbols, and the quantity of remaining control channel symbols is 2, it indicates that the network device 10 still needs to occupy 2 symbols to transmit the RS, the DCI, and the HARQ feedback information.

In one embodiment, the network device 10 may further configure the control channel symbol information through higher layer signaling.

In the embodiment of this application, based on the determined beam that needs to be transmitted, the network device sets a common search space in the time-frequency resource corresponding to the symbol corresponding to each beam, one common search space occupies one symbol, and the DCI that a plurality of terminal devices need to receive is mapped to all common search spaces. By setting a common search space in the time-frequency resource corresponding to the symbol corresponding to each beam, the network device ensures that all terminal devices in the directions corresponding to different beams can detect the common search space, and further, can detect whether the common search space carries DCI, thereby enhancing a coverage capacity of a communications system based on a beamforming technology.

Further, on the basis of the foregoing embodiment, an embodiment of this application further provides a resource processing method. After the terminal device 20 obtains the DCI carried in the common search space, the method further includes:

S405: Based on the time range and the frequency domain resource corresponding to the symbol on which the DCI carried in the common search space is detected, the terminal device 20 obtains resource location information of a dedicated search space, and attempts to blindly detect the DCI carried in the dedicated search space.

In one embodiment, a formation manner of the dedicated search space may be similar to that of the dedicated search space in the LTE system. For example, the aggregation level of the dedicated search space may be any of 1, 2, 4, or 8, and a corresponding total quantity of CCEs of the dedicated search space is 6, 12, 8, or 16 respectively. The CCEs that form the dedicated search space are distributed on the frequency domain resource corresponding to the same symbol, and REGs that form a CCE are distributed on the frequency domain resource corresponding to the same symbol. A start point of the dedicated search space in the CCEs included in the current symbol may depend on, for example, an identifier of the terminal device 20 or a current subframe number. After detecting the DCI carried in the common search space, the terminal device 20 can calculate a start point location of the dedicated search space on the frequency domain resource corresponding to the current symbol, and then perform blind detection for 16 times by starting from this start point location, to obtain the DCI carried in the dedicated search space.

In another embodiment, the formation manner of the dedicated search space may be similar to that of the dedicated search space in the 5G where the total quantity of CCEs of the dedicated search space is 16, and the aggregation level of the dedicated search space may be any of 2, 4, 8, or 16. The CCEs that form the dedicated search space are also distributed over one symbol. In this case, the terminal device 20 needs to perform blind detection for at most (16/2+16/4+16/8+16/16)=15 times within the time range corresponding to the current symbol. A start point of the dedicated search space in the CCEs included in the current symbol may be determined in the same way as the method for determining a start point of a dedicated search space in 5G.

In another embodiment, the dedicated search space may occupy other quantities of CCEs depending on actual requirements, and other aggregation levels may be set. This is not limited in this application.

Figure 5:
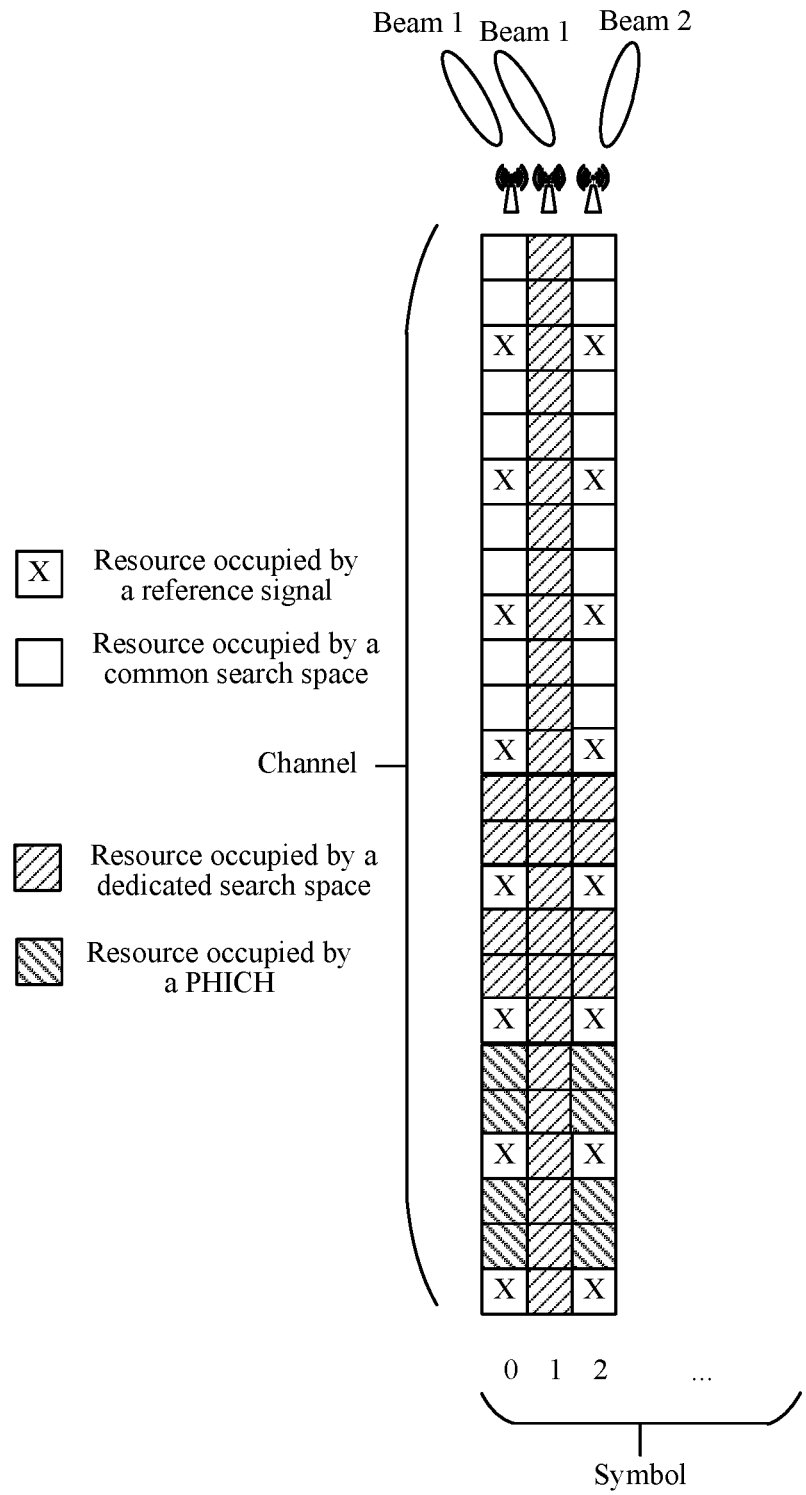
FIG. 5 is a schematic diagram of a control resource mapping structure according to an embodiment of this application.

This application further provides an embodiment of a resource processing method. FIG. 5 is a schematic diagram of a control resource mapping structure according to one embodiment of this application. As shown in FIG. 5, different from the embodiment shown in FIG. 4, a quantity of symbols occupied by the network device 10 in the embodiment to transmit the RS, the DCI, and the HARQ feedback information in the direction corresponding to each beam is different. In this embodiment, the network device 10 determines that two beams need to be transmitted, and the mapping manner of the RS, the DCI, and the HARQ feedback information on the control resource is described by using an example in which the terminal devices 20 located in directions corresponding to two different beams need to be served, where the quantity of terminal devices 20 in a direction corresponding to each beam may be the same or different. The following elaborates on only differences between the embodiment shown in FIG. 5 and the embodiment shown in FIG. 4.

Referring to FIG. 5, an embodiment of this application provides a resource processing method, including the following operations.

S501: A network device determines beams that need to be transmitted, and determines a part of a frequency domain resource corresponding to each beam to serve as a common search space.

For example, when the network device 10 transmits information through a radio frequency RF link, one beam corresponds to one symbol group, and the quantity of symbols included in each symbol group may be different. In one embodiment, the quantity of symbols occupied by each beam may be different. Within one symbol group, the network device 10 controls an RF link to transmit a beam corresponding to the symbol group, so that a terminal device 20 in a direction corresponding to the beam can receive information transmitted within the time range corresponding to this symbol group. In this embodiment, after determining two beams, the network device 10 determines corresponding time-frequency resources for the two beams separately. For example, the network device 10 determines a symbol group corresponding to a beam 1 and a symbol group corresponding to a beam 2. Referring to FIG. 5, the symbol group corresponding to the beam 1 includes a symbol #0 and a symbol #1, and the symbol group corresponding to the beam 2 includes a symbol #2. The time-frequency resource corresponding to each beam is a frequency domain resource corresponding to the corresponding symbol group. On frequency domain resources, the network device 10 further determines a frequency domain resource corresponding to a common search space for each beam. As shown in FIG. 5, the common search space on the frequency domain resource corresponding to the beam 1 may occupy one symbol. In one embodiment, the common search space on the frequency domain resource corresponding to the beam 1 may also occupy two symbols. In this case, the REGs that form a CCE may occupy two symbols, and the common search space includes at least one CCE; or the REGs that form a CCE occupy one symbol, and the common search space includes the CCEs distributed on the frequency domain resources corresponding to different symbols.

S502: The network device maps DCI to the common search space.

For example, when the network device 10 transmits the DCI to the terminal device 20, the network device 10 maps one piece of DCI to each common search space, to ensure that all terminal devices 20 in directions corresponding to the two beams can receive the DCI carried in the common search space. For example, when the common search space is distributed on the frequency domain resources corresponding to the two symbols, the DCI carried in the common search space may be mapped to the frequency domain resources corresponding to the two symbols, or may be mapped to the frequency domain resource corresponding to any of the two symbols.

In one embodiment, when the symbol group corresponding to one beam includes at least two symbols, the network device 10 generally determines, in a first symbol of the symbol group, a part of the frequency domain resource for mapping the RS and a part of the frequency domain resource for mapping the HARQ feedback information. No overlap exists between the part that corresponds to the common search space and that is of the frequency domain resource, the part of the frequency domain resource for mapping the RS, and the part of the frequency domain resource for mapping the HARQ feedback information. In one embodiment, the frequency domain resource corresponding to the symbol group corresponding to each beam carries at least one RS.

In one embodiment, the network device 10 further determines a part of the frequency domain resource corresponding to the symbol group corresponding to each beam to serve as a dedicated search space. When the symbol group corresponding to the beam includes at least two symbols, the dedicated search space may be distributed on frequency domain resources corresponding to the at least two symbols. For example, the REGs that form a CCE may occupy at least two symbols, and the dedicated search space includes at least one CCE; or the REGs that form a CCE occupy one symbol, and the dedicated search space includes the CCEs distributed on the frequency domain resources corresponding to at least two symbols.

S503. The network device 10 transmits resource location information of the common search space to the terminal device 20.

For example, the terminal device 20 obtains resource location information of the common search space on the frequency domain resource corresponding to the corresponding symbol group. For example, the terminal device 20 receives symbol information and frequency domain resource information of resources occupied by each common search space, and the frequency domain resource information may be, for example, subcarrier information. When the symbol group includes at least two symbols, the common search space may be distributed on frequency domain resources corresponding to at least one symbol included in the symbol group. In one embodiment, to reduce signaling overheads, as shown in FIG. 5, each common search space may be located on the frequency domain resource corresponding to the first symbol of each symbol group, and each common search space occupies the same frequency domain resource location in the time-frequency resource corresponding to each symbol group. In this case, the network device 10 may transmit only one piece of resource location information, such as subcarrier information, so that the terminal device 20 can use the obtained resource location information as the resource location information of the common search space on the frequency domain resource corresponding to each symbol.

S504. Based on the received resource location information of the common search space, the terminal device 20 obtains the DCI carried in the common search space.

For example, the terminal device 20 receives the resource location information of the CCEs or REGs occupied by each common search space, and the resource location information includes symbol information and subcarrier information, where the symbols indicated in the symbol information corresponding to each common search space may be different. In this case, a common search space is determined at a subcarrier corresponding to each symbol in corresponding chronological order of symbols, and then an attempt is made to detect whether DCI is carried in the common search space. If the DCI carried in the common search space is detected, the terminal device 20 stops the attempt of detection; or continues detection until detection at all resource locations indicated by the resource location information is completed.

For example, when receiving information about a frequency domain resource occupied by each common search space, such as subcarrier information, the terminal device 20 determines, based on the resource location information and by starting from the first symbol, the common search space at a location indicated by the resource location information and within a time range corresponding to each symbol, and then attempts to detect whether the common search space carries the DCI. If the DCI is detected, the terminal device 20 stops the attempt of detection; or continues detection until all symbols indicated by the maximum quantity of symbols have been traversed.

The common search space corresponding to each symbol group further carries control channel symbol information. Similar to the embodiment shown in FIG. 4, the control channel symbol information may be at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

In this embodiment, the network device 10 may transmit the total quantity of control channel symbols on the current beam or the quantity of remaining control channel symbols on the current beam as the control channel symbol information. Referring to FIG. 5, when the current beam is a beam 1 and the current symbol is a symbol #0, a value of the total quantity of control channel symbols on the current beam is 2, and a value of the quantity of remaining control channel symbols on the current beam is 1.

In the embodiment of this application, the network device determines the beams that need to be transmitted, and sets a common search space in the time-frequency resource corresponding to the symbol group corresponding to each beam. One common search space occupies one symbol group, one symbol group corresponds to at least one symbol, and the DCI that a plurality of terminal devices need to receive is mapped to all common search spaces. By setting a common search space in the time-frequency resource corresponding to the symbol group corresponding to each beam, the network device ensures that all terminal devices in the directions corresponding to different beams can detect the common search space, and further, can detect whether the common search space carries DCI, thereby enhancing a coverage capacity of a communications system based on a beamforming technology. The network device in this embodiment can transmit, based on actual requirements, beams in a time range corresponding to the symbol group that includes a different quantity of symbols, so that the common search space and the DCI carried in the common search space can be more flexibly distributed in the time-frequency resources.

Further, on the basis of the foregoing embodiment, an embodiment of this application further provides a resource processing method. After the terminal device 20 obtains the DCI carried in the common search space, the method further includes:

S505: Within the time range and on the frequency domain resource corresponding to the symbol group on which the DCI in the common search space is detected, the terminal device 20 obtains resource location information of a dedicated search space, and attempts to blindly detect the DCI carried in the dedicated search space.

In one embodiment, a formation manner of the dedicated search space in any symbol group in this embodiment may be similar to that of the dedicated search space in an LTE system, or similar to that of the dedicated search space in 5G. In one embodiment, the dedicated search space may occupy other quantities of CCEs depending on actual requirements, and other aggregation levels may be set. This is not limited in this application.

Figure 6:
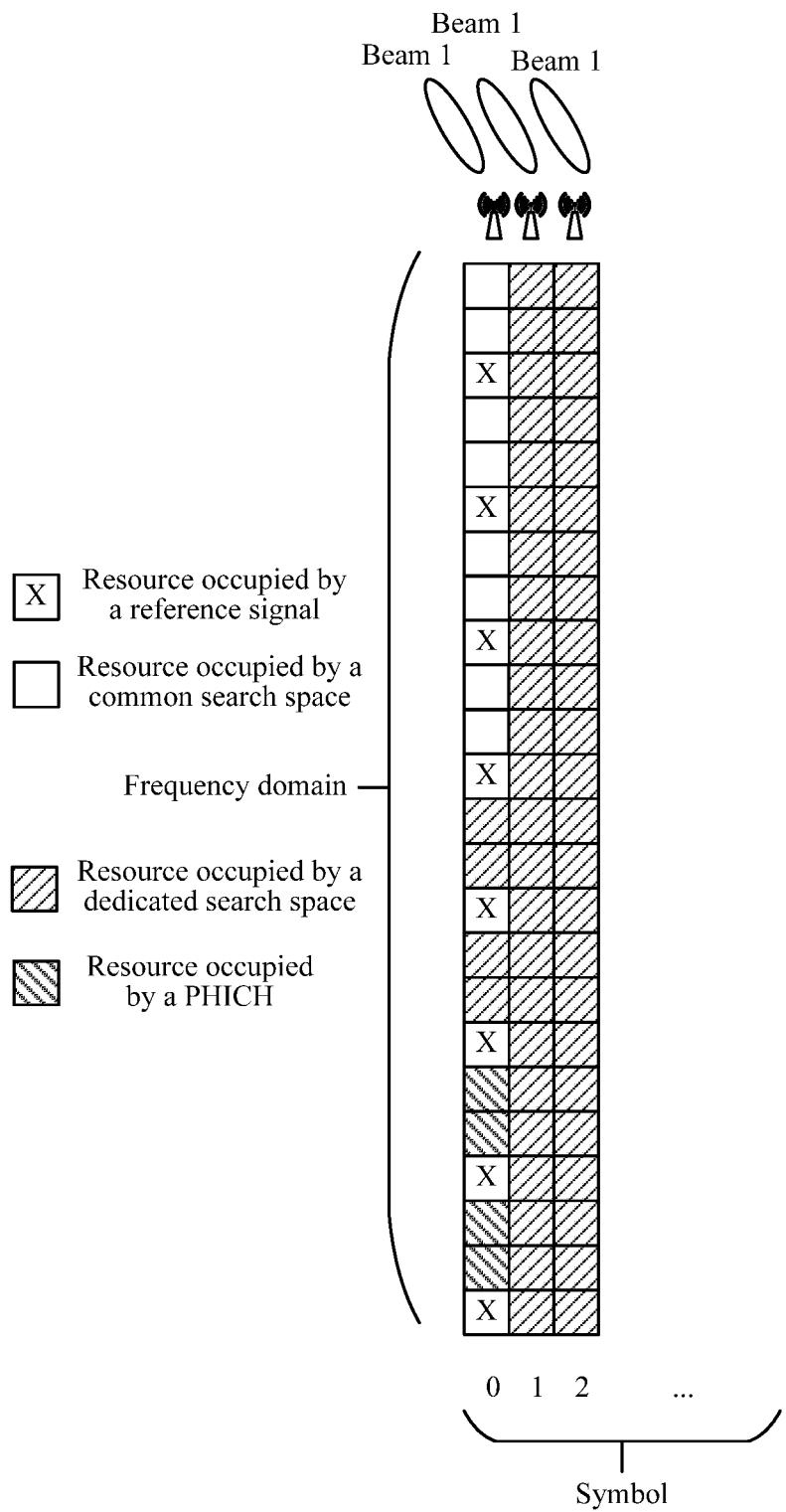
FIG. 6 is a schematic diagram of a control resource mapping structure according to and embodiment of this application.

This application further provides an embodiment of a resource processing method. FIG. 6 is a schematic diagram of a control resource mapping structure according to one embodiment of this application. As shown in FIG. 6, different from the embodiment shown in FIG. 5, all beams in this embodiment face one direction. In one embodiment, the resource processing method provided in this application is also applicable to a case in which the quantity of beams determined by the network device is 1. Compared with the embodiment shown in FIG. 5, the network device 10 in this embodiment no longer transmits the beam 2. The symbol group corresponding to the beam in this embodiment includes at least one symbol. The following elaborates on only differences between the embodiment shown in FIG. 6 and the embodiment shown in FIG. 5.

Referring to FIG. 6, an embodiment of this application provides a resource processing method, including the following operations.

S601: A network device determines a beam that needs to be transmitted, and determines a part of a frequency domain resource corresponding to each beam to serve as a common search space.

In this embodiment, for example, the network device 10 determines that only one beam needs to be transmitted. For example, the network device 10 may determine that all terminal devices 20 are in a direction corresponding to a same beam, or that only one terminal device 20 needs to be served. The direction of the beam is consistent with the direction of the terminal device 20 that needs to be served. When only one beam needs to be transmitted, the beam corresponds to one symbol group, and the symbol group includes at least one symbol. FIG. 6 shows an example in which a beam 1 corresponds to 3 symbols.

S602: The network device maps DCI to the common search space.

In one embodiment, the network device 10 in the embodiment first determines the beam that needs to be transmitted, that is, the beam 1; and then determines a time-frequency resource corresponding to the beam 1, and in the time-frequency resource, determines a part that is occupied by the common search space and that is of the time-frequency resource; and adds, to the common search space for transmission, the DCI that needs to be added to the common search space for transmission. The time-frequency resource occupied by the common search space may occupy 3 symbols, as shown in FIG. 6. The DCI carried in the common search space may also be distributed over frequency domain resources corresponding to the 3 symbols.

S603. The network device 10 transmits the resource location information of the common search space to the terminal device 20.

S604. Based on the received resource location information of the common search space, the terminal device 20 obtains the DCI carried in the common search space.

S605: Based on the time range and the frequency domain resource corresponding to the symbol group on which the DCI in the common search space is detected, the terminal device 20 obtains resource location information of a dedicated search space, and attempts to blindly detect the DCI carried in the dedicated search space.

Operations S603 to S605 are similar to operations S503 to S505 in the embodiment shown in FIG. 5, and are not repeated in this application.

In this embodiment, based on a beam that needs to be transmitted, the network device determines a common search space in the time-frequency resource corresponding to a symbol group, and then adds the DCI to the common search space. The network device transmits the beam in the time range corresponding to the symbol group, thereby ensuring that the terminal device located in the direction corresponding to the beam can detect the common search space and can further detect whether the common search space carries DCI. In addition, when only one beam needs to be transmitted in a subframe, the network device distributes the common search space across symbols, thereby reducing occupied frequency domain resources.

Figure 7:
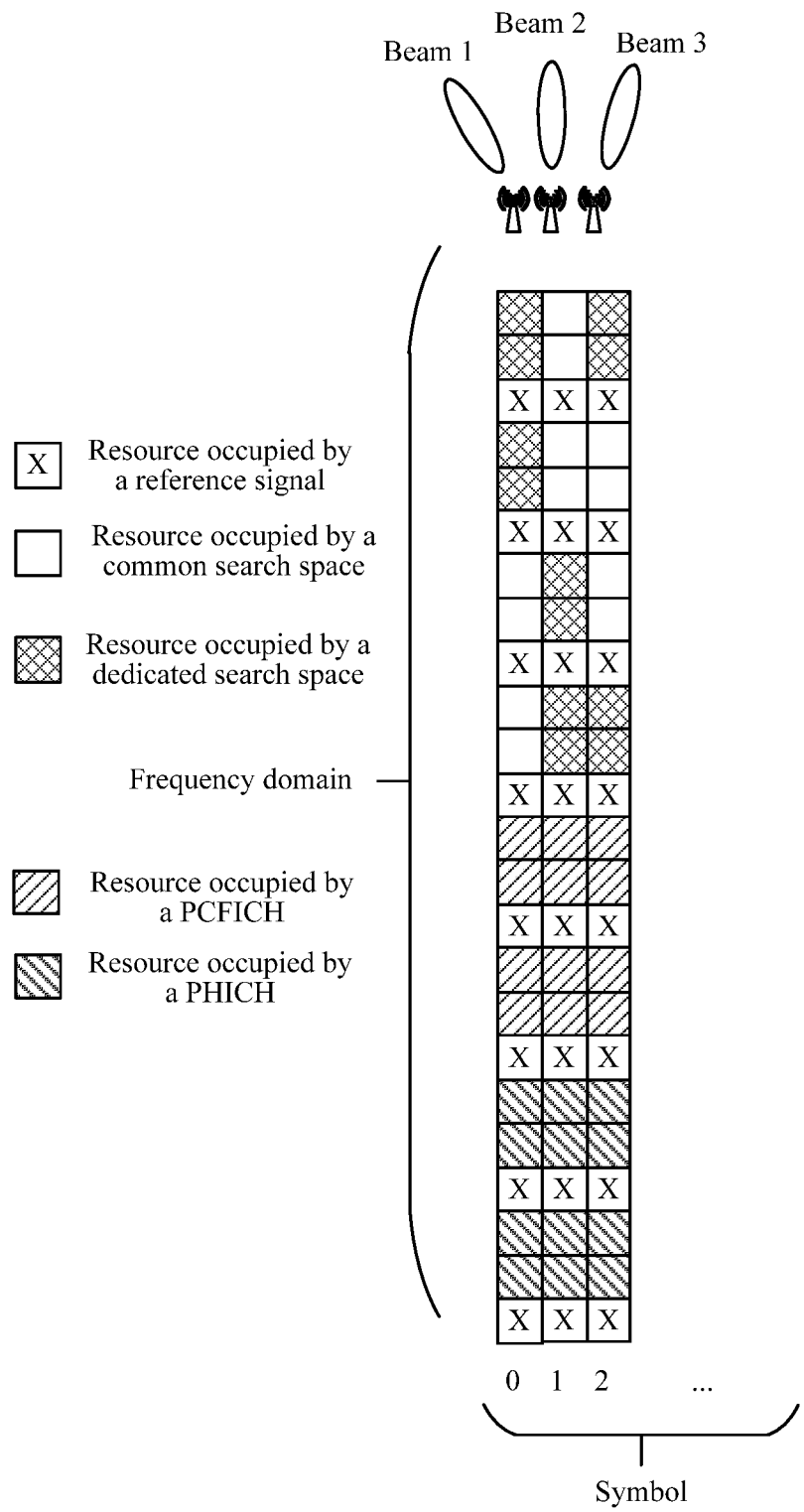
FIG. 7 is a schematic diagram of a control resource mapping structure according to an embodiment of this application.

This application further provides an embodiment of a resource processing method. FIG. 7 is a schematic diagram of a control resource mapping structure according to one embodiment of this application. As shown in FIG. 7, different from the embodiment shown in FIG. 4, in this embodiment, a PCFICH is also mapped to the frequency domain resource corresponding to the symbol corresponding to each beam, and the PCFICH carries a CFI. The following elaborates on only differences between the embodiment shown in FIG. 7 and the embodiment shown in FIG. 4.

Referring to FIG. 7, an embodiment of this application provides a resource processing method, including the following operations.

S701: A network device determines beams that need to be transmitted, and determines a part of a frequency domain resource corresponding to each beam to serve as a common search space.

This operation is similar to operation S401 in the embodiment shown in FIG. 4, and is not repeated in this application.

S702: The network device maps DCI and a CFI to a time-frequency resource.

For example, the network device 10 maps the DCI to a common search space. The mapping manner is similar to that in operation S702, and is not repeated in this application.

Different from the embodiment shown in FIG. 4, in this embodiment, the network device 10 further determines, on the frequency domain resource corresponding to the symbol corresponding to each beam, a part of the frequency domain resource for mapping the CFI. The CFI is carried on a PCFICH. No overlap exists between the part of the frequency domain resource for mapping the CFI, the part that corresponds to the common search space and that is of the frequency domain resource, the part of the frequency domain resource for mapping the RS, the part of the frequency domain resource for mapping the HARQ feedback information, and the part that corresponds to the dedicated search space and that is of the frequency domain resource. The network device 10 maps the CFI to the frequency domain resource corresponding to the symbol corresponding to each beam, and the CFI is carried in the PCFICH. In this embodiment, the common search space no longer carries control channel symbol information. In one embodiment, each beam may correspond to a plurality of symbols.

In one embodiment, configuration information of the PCFICH is configured by the network device 10 through higher layer signaling. Similar to the control channel symbol information in the embodiments shown in FIG. 4 to FIG. 6, the CFI is used to indicate the quantity of symbols occupied by the network device 10 to transmit the RS, the DCI, and the HARQ feedback information. For example, similar to the control channel symbol information, the CFI may be at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel. This is not described in detail again in this application.

S703. On each symbol, the terminal device 20 attempts to receive an RS, HARQ feedback information carried on a PHICH, and a CFI carried on the PCFICH.

S704. When the terminal device 20 receives the RS, HARQ feedback information, and the CFI, based on the CFI and information about resources occupied by the PCFICH, the RS, and the PHICH, the terminal device 20 obtains indexes of CCEs within a time range corresponding to a current symbol.

For example, the manner of obtaining the indexes of CCEs may be similar to that in operation S202 in the embodiment shown in FIG. 2. This is not described in detail again in this application.

S705: The terminal device 20 determines, based on the indexes of CCEs in the time range corresponding to the current symbol, a common search space in the frequency domain resource corresponding to the current symbol, performs blind detection in the common search space, and obtains the DCI carried in the common search space.

S706. Based on the time range and the frequency domain resource corresponding to the current symbol, the terminal device 20 obtains resource location information of a dedicated search space, and attempts to blindly detect DCI carried in the dedicated search space.

Operations S705 and S706 are similar to operations S203 to S204 in the embodiment shown in FIG. 2, and are not repeated in this application.

In this embodiment, based on a beam that needs to be transmitted, the network device determines a common search space in the time-frequency resource corresponding to a symbol or a symbol group, and then adds the DCI to the common search space. In addition, the time-frequency resource for carrying the CFI is determined in the time-frequency resource corresponding to a symbol or a symbol group, where the CFI is carried on a PCFICH. Because the CFI is carried in the time-frequency resource corresponding to each beam, it is convenient for the terminal device 20 to obtain, based on the CFI, the resource location information of the common search space in the time-frequency resource corresponding to each beam. Therefore, a common search space corresponding to each symbol may be at a different location of the time-frequency resource, thereby being highly flexible. This also prevents the network device from transmitting the resource location information of the common search space corresponding to each symbol to the terminal device, and reduces signaling overheads.

Another aspect of the embodiments of this application further provides a resource processing apparatus. The resource processing apparatus is configured to perform the resource processing method on a network device side in the foregoing embodiment, and has the same technical features and technical effects. Details are not described again in this application.

Figure 8:
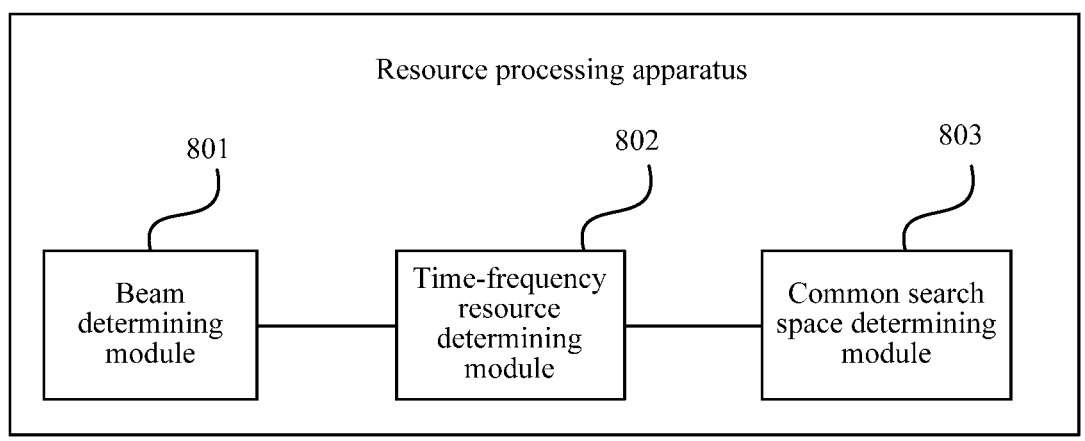
FIG. 8 is a schematic structural diagram of a resource processing apparatus according to an embodiment of this application.

FIG. 8 is a schematic structural diagram of a resource processing apparatus according to an embodiment of this application. In this embodiment, the resource processing apparatus may be implemented by software, hardware, or a combination of software and hardware. As shown in FIG. 8, the resource processing apparatus includes:

a beam determining module 801, configured to determine at least two beams that need to be transmitted;

a time-frequency resource determining module 802, configured to determine a time-frequency resource corresponding to each of the at least two beams; and a common search space determining module 803, configured to determine a part of the time-frequency resource corresponding to each beam to serve as a common search space, where the part that corresponds to the common search space and that is of the time-frequency resource is used to carry control information transmitted to a terminal device.

Figure 9:
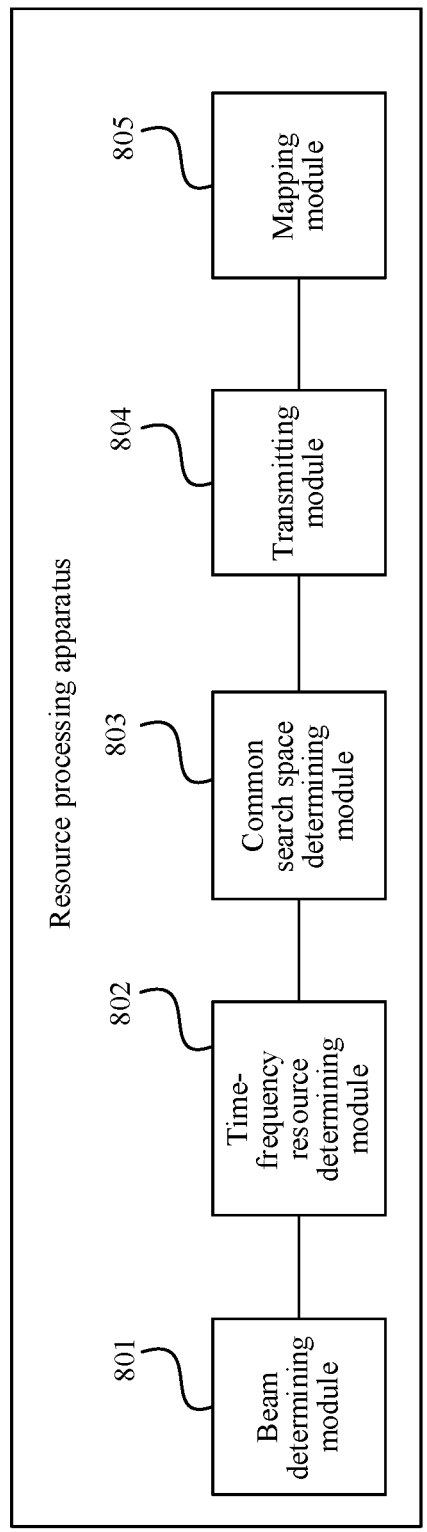
FIG. 9 is a schematic structural diagram of a resource processing apparatus according to another embodiment of this application.

Further, on the basis of the embodiment shown in FIG. 8, FIG. 9 is a schematic structural diagram of a resource processing apparatus according to another embodiment of this application. As shown in FIG. 9, the resource processing apparatus further includes:

a transmitting module 804, configured to transmit resource location information to the terminal device, where the resource location information is used to indicate a location of the common search space in the time-frequency resource.

In one embodiment, the resource location information is used to indicate a location of a physical downlink control channel in the time-frequency resource corresponding to the common search space, where the physical downlink control channel is occupied in the common search space by the control information carried in the common search space.

In one embodiment, the control information includes downlink control information, and the downlink control information is used to indicate a configuration parameter for uplink and downlink data transmission of the terminal device.

In one embodiment, the downlink control information further includes control channel symbol information.

In one embodiment, as shown in FIG. 9, the resource processing apparatus further includes:

a mapping module 805, configured to map one piece of downlink control information to each common search space.

In one embodiment, the beam determining module 801 is configured to:

determine, based on a type of the control information, the at least two beams that need to be transmitted; or determine, based on information about a direction of the terminal device, the at least two beams that need to be transmitted; or determine, based on a beam width, the at least two beams that need to be transmitted.

In one embodiment, the time-frequency resource determining module 802 is configured to:

determine a symbol group corresponding to each of the at least two beams, and obtain, based on a time-frequency resource corresponding to the symbol group, the time-frequency resource corresponding to each of the at least two beams, where each symbol group includes at least one symbol, where the part that corresponds to each common search space and that is of the time-frequency resource is distributed on at least one symbol in each symbol group.

The time-frequency resource determining module 802 is further configured to: determine a part of the time-frequency resource corresponding to each beam to carry control frame format indicator information, where the control frame format indicator information is used to indicate control channel symbol information, and the part of the time-frequency resource for carrying the control frame format indicator information does not overlap the part that corresponds to the common search space and that is of the time-frequency resource.

In one embodiment, the time-frequency resource determining module 802 is further configured to:

determine a part of the time-frequency resource corresponding to each beam to serve as a dedicated search space, where the part that corresponds to the dedicated search space and that is of the time-frequency resource is used to carry control information that needs to be received by one terminal device.

In one embodiment, the time-frequency resource determining module 802 is further configured to:

determine a part of the time-frequency resource corresponding to each beam to carry a reference signal, where the reference signal is used to assist the terminal device in obtaining the control information, and the part of the time-frequency resource for carrying the reference signal does not overlap the part that corresponds to the common search space and that is of the time-frequency resource.

In one embodiment, the time-frequency resource determining module 802 is further configured to:

determine a part of the time-frequency resource corresponding to each beam to carry hybrid automatic repeat request feedback information, where the hybrid automatic repeat request feedback information includes a response of the network device to receiving of uplink data from the terminal device, and the part of the time-frequency resource for carrying the hybrid automatic repeat request feedback information does not overlap the part that corresponds to the common search space and that is of the time-frequency resource.

In one embodiment, the symbol is a minimum unit into which a time-frequency resource is divided in time domain.

In one embodiment, the transmitting module 804 is configured to transmit the resource location information of the common search space to the terminal device through higher layer signaling.

In one embodiment, the transmitting module 804 is configured to transmit the resource location information of the common search space in broadcast mode.

In one embodiment, the control channel symbol information is at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

In one embodiment, the transmitting module 804 is further configured to transmit control channel symbol information to the terminal device through higher layer signaling.

In one embodiment, the higher layer signaling is any one of the following:

medium access control-control unit signaling, non-access stratum signaling, radio resource control signaling, packet data convergence protocol signaling, or radio link control signaling.

In one embodiment, the symbol group corresponding to each beam includes a different quantity of symbols.

In one embodiment, the symbol group corresponding to each beam includes a same quantity of symbols.

In one embodiment, the control frame format indicator information is at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

Another aspect of the embodiments of this application further provides a resource processing apparatus. The resource processing apparatus is configured to perform the resource processing method on a terminal device side in the foregoing embodiment, and has the same technical features and technical effects. Details are not described again in this application.

Figure 10:
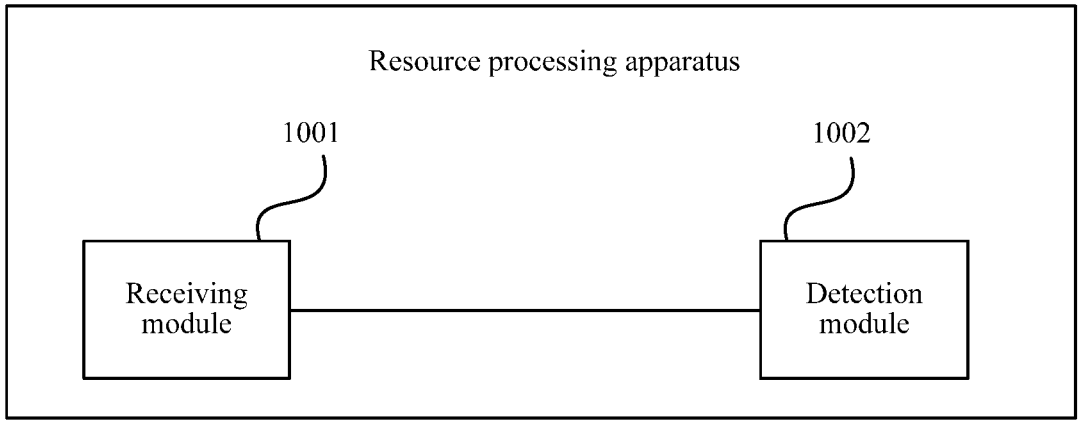
FIG. 10 is a schematic structural diagram of a resource processing apparatus according to still another embodiment of this application.

FIG. 10 is a schematic structural diagram of a resource processing apparatus according to still another embodiment of this application. In this embodiment, the resource processing apparatus may be implemented by software, hardware, or a combination of software and hardware. As shown in FIG. 10, the resource processing apparatus includes:

a receiving module 1001, configured to receive resource location information transmitted by a network device, where the resource location information is used to indicate a location of at least one common search space in a time-frequency resource; and a detection module 1002, configured to detect, based on the resource location information, whether control information carried in a common search space exists.

In one embodiment, the resource location information includes frequency domain location information, and the detection module 1002 is configured to:

determine, by starting from a first symbol of a current subframe, a common search space at a frequency domain location in a frequency domain resource corresponding to the first symbol, and detect whether control information is carried in the common search space; and determine, if no control information is carried in the common search space, a common search space within a time range corresponding to a next symbol of the current subframe and at a frequency domain location in a frequency domain resource corresponding to the second symbol, and detect whether control information is carried in the common search space, until the control information is detected or all symbols indicated by a maximum quantity of symbols are traversed, where the maximum quantity of symbols is used to indicate a maximum value of the quantity of symbols on which the common search space is distributed in the current subframe.

In one embodiment, the resource location information includes at least one piece of symbol group information, and frequency domain location information corresponding to each piece of symbol group information, and one symbol group includes at least one symbol; and the detection module 1002 is configured to:

determine a common search space within a time range corresponding to a first symbol group and at a frequency domain location in a frequency domain resource corresponding to the first symbol group, and detect whether control information is carried in the common search space; and determine, if no control information is carried in the common search space, a common search space within a time range corresponding to a next symbol group and at a frequency domain location in a frequency domain resource corresponding to the next symbol group, and detect whether control information is carried in the common search space, until the control information is detected or all symbol groups are traversed.

In one embodiment, the symbol is a minimum unit into which a time-frequency resource is divided in time domain.

In one embodiment, the receiving module 1001 is configured to receive resource location information of the common search space, where the resource location information is transmitted by the network device through higher layer signaling.

In one embodiment, the receiving module 1001 is configured to receive resource location information of the common search space, where the resource location information is transmitted by the network device in broadcast mode.

In one embodiment, the control information includes downlink control information, and the downlink control information is used to indicate a configuration parameter for uplink and downlink data transmission of the terminal device.

In one embodiment, the downlink control information further includes control channel symbol information.

In one embodiment, the receiving module 1001 is further configured to receive control channel symbol information transmitted by the network device to the terminal device through higher layer signaling.

In one embodiment, the control channel symbol information is at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

In one embodiment, the higher layer signaling is any one of the following:

medium access control-control unit signaling, non-access stratum signaling, radio resource control signaling, packet data convergence protocol signaling, or radio link control signaling.

In one embodiment, the detection module 1002 is further configured to:

detect whether any control frame format indicator information carried on a physical control format indicator channel exists in all symbols indicated by a maximum quantity of symbols of the current subframe, where the control frame format indicator information is used to indicate the control channel symbol information.

In one embodiment, the detection module 1002 is further configured to:

detect, in a symbol group on which the control information is detected, based on the control channel symbol information, downlink control information carried in a dedicated search space.

In one embodiment, the detection module 1002 is further configured to:

detect whether any reference signal exists in all symbols indicated by a maximum quantity of symbols of the current subframe, where the reference signal is used to assist the terminal device in obtaining the control information.

In one embodiment, the detection module 1002 is further configured to:

detect whether any hybrid automatic repeat request feedback information carried on a physical hybrid automatic repeat request indicator channel exists in all symbols indicated by a maximum quantity of symbols of the current subframe, where the hybrid automatic repeat request feedback information includes a response of the network device to receiving of uplink data from the terminal device.

Another aspect of the embodiments of this application further provides a network device. The network device is configured to perform the resource processing methods described in the embodiments shown in FIG. 3 to FIG. 7, and has the same technical features and technical effects. Details are not described again in this application.

Figure 11:
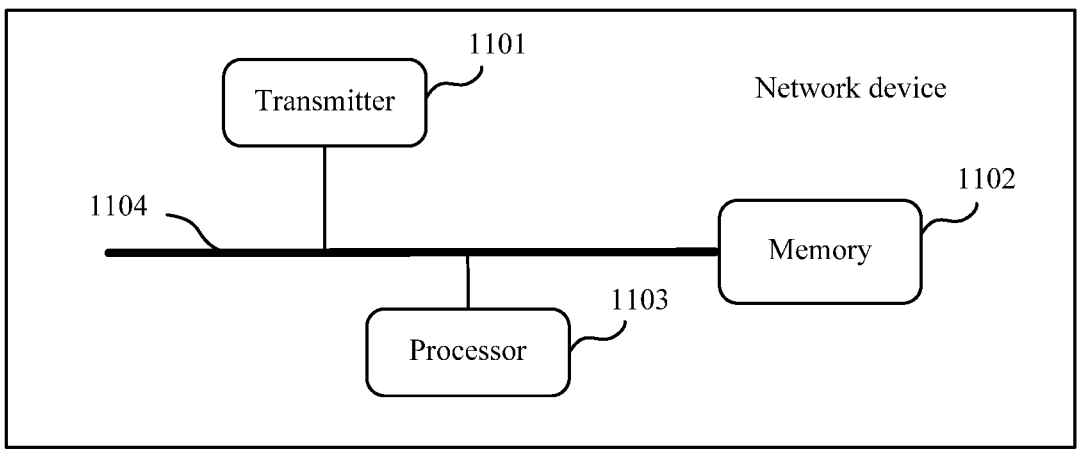
FIG. 11 is a schematic structural diagram of a network device according to an embodiment of this application.

FIG. 11 is a schematic structural diagram of a network device according to an embodiment of this application. As shown in FIG. 11, the network device includes: a transmitter 1101, a memory 1102, a processor 1103, and at least one communications bus 1104. The communications bus 1104 is configured to implement a communication connection between components. The memory 1102 may include a high-speed random access memory, and may further include a non-volatile memory, for example, at least one magnetic disk memory. The memory 1102 may store various programs, to implement various processing functions and implement method steps or operations of the embodiments. The processor 1103 is configured to execute the programs stored in the memory 1102. In this embodiment, the transmitter 1101 may be a radio frequency processing module or a baseband processing module in the network device. The transmitter 1101 is coupled to the processor 1103.

The processor 1101 is configured to:

determine at least two beams that need to be transmitted; and determine a time-frequency resource corresponding to each of the at least two beams; and determine a part of the time-frequency resource corresponding to each beam to serve as a common search space, where the part that corresponds to the common search space and that is of the time-frequency resource is used to carry control information transmitted to a terminal device.

In one embodiment, the transmitter 1101 is configured to transmit resource location information to the terminal device, where the resource location information is used to indicate a location of the common search space in the time-frequency resource.

In one embodiment, the resource location information is used to indicate a location of a physical downlink control channel in the time-frequency resource corresponding to the common search space, where the physical downlink control channel is occupied in the common search space by the control information carried in the common search space.

In one embodiment, the control information includes downlink control information, and the downlink control information is used to indicate a configuration parameter for uplink and downlink data transmission of the terminal device.

In one embodiment, the downlink control information further includes control channel symbol information.

In one embodiment, the processor 1101 is further configured to:

map one piece of downlink control information to each common search space.

In one embodiment, the processor 1101 is configured to:

determine, based on a type of the control information, the at least two beams that need to be transmitted; or determine, based on information about a direction of the terminal device, the at least two beams that need to be transmitted; or determine, based on a beam width, the at least two beams that need to be transmitted.

In one embodiment, the processor 1101 is further configured to:

determine a symbol group corresponding to each of the at least two beams, and obtain, based on a time-frequency resource corresponding to the symbol group, the time-frequency resource corresponding to each of the at least two beams, where each symbol group includes at least one symbol, where the part that corresponds to each common search space and that is of the time-frequency resource is distributed on at least one symbol in each symbol group.

In one embodiment, the resource location information includes at least one piece of symbol group information, and frequency domain resource information corresponding to each piece of symbol group information.

In one embodiment, the processor 1101 is further configured to:

determine a part of the time-frequency resource corresponding to each beam to carry control frame format indicator information, where the control frame format indicator information is used to indicate control channel symbol information, and the part of the time-frequency resource for carrying the control frame format indicator information does not overlap the part that corresponds to the common search space and that is of the time-frequency resource.

In one embodiment, the processor 1101 is further configured to:

determine a part of the time-frequency resource corresponding to each beam to serve as a dedicated search space, where the part that corresponds to the dedicated search space and that is of the time-frequency resource is used to carry control information that needs to be received by one terminal device.

In one embodiment, the processor 1101 is further configured to:

determine a part of the time-frequency resource corresponding to each beam to carry a reference signal, where the reference signal is used to assist the terminal device in obtaining the control information, and the part of the time-frequency resource for carrying the reference signal does not overlap the part that corresponds to the common search space and that is of the time-frequency resource.

In one embodiment, the processor 1101 is further configured to:

determine a part of the time-frequency resource corresponding to each beam to carry hybrid automatic repeat request feedback information, where the hybrid automatic repeat request feedback information includes a response of the network device to receiving of uplink data from the terminal device, and the part of the time-frequency resource for carrying the hybrid automatic repeat request feedback information does not overlap the part that corresponds to the common search space and that is of the time-frequency resource.

In one embodiment, the symbol is a minimum unit into which a time-frequency resource is divided in time domain.

In one embodiment, the transmitter 1102 is configured to:

transmit the resource location information of the common search space to the terminal device through higher layer signaling.

In one embodiment, the transmitter 1102 is configured to:

transmit the resource location information of the common search space in broadcast mode.

In one embodiment, the control channel symbol information is at least one of:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

In one embodiment, the transmitter 1102 is further configured to:

transmit control channel symbol information to the terminal device through higher layer signaling.

In one embodiment, the higher layer signaling is any one of the following:

medium access control-control unit signaling, non-access stratum signaling, radio resource control signaling, packet data convergence protocol signaling, or radio link control signaling.

In one embodiment, the symbol group corresponding to each beam includes a different quantity of symbols.

In one embodiment, the symbol group corresponding to each beam includes a same quantity of symbols.

In one embodiment, the control frame format indicator information is at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

Another aspect of the embodiments of this application further provides a terminal device. The terminal device is configured to perform the resource processing methods described in the embodiments shown in FIG. 3 to FIG. 7, and has the same technical features and technical effects. Details are not described again in this application.

Figure 12:
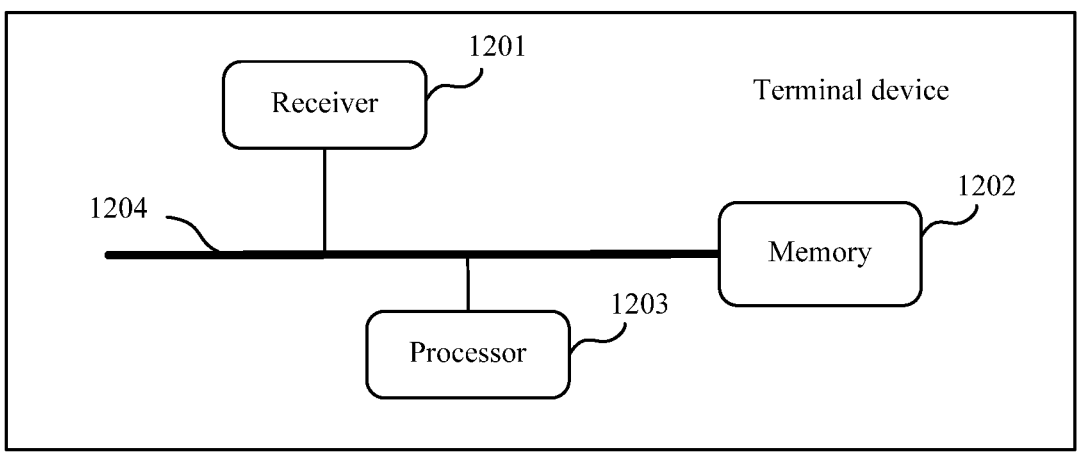
FIG. 12 is a schematic structural diagram of a terminal device according to an embodiment of this application.

FIG. 12 is a schematic structural diagram of a terminal device according to an embodiment of this application. As shown in FIG. 12, the terminal device includes: a receiver 1201, a memory 1202, a processor 1203, and at least one communications bus 1204. The communications bus 1204 is configured to implement a communication connection between components. The memory 1202 may include a high-speed random access memory, and may further include a non-volatile memory, for example, at least one magnetic disk memory. The memory 1202 may store various programs, to implement various processing functions and implement method steps or operations of the embodiments. The processor 1203 is configured to execute the programs stored in the memory 1202. In this embodiment, the receiver 1201 may be a radio frequency processing module or a baseband processing module in the terminal device. The receiver 1201 is coupled to the processor 1203.

The receiver 1201 is configured to receive resource location information transmitted by a network device, where the resource location information is used to indicate a location of at least one common search space in a time-frequency resource.

The processor 1202 is configured to detect, based on the resource location information, whether control information carried in a common search space exists.

In one embodiment, the resource location information includes frequency domain location information, and the processor 1202 is configured to:

determine, by starting from a first symbol of a current subframe, a common search space at a frequency domain location in a frequency domain resource corresponding to the first symbol, and detect whether control information is carried in the common search space; and determine, if no control information is carried in the common search space, a common search space within a time range corresponding to a next symbol of the current subframe and at a frequency domain location in a frequency domain resource corresponding to the second symbol, and detect whether control information is carried in the common search space, until the control information is detected or all symbols indicated by a maximum quantity of symbols are traversed, where the maximum quantity of symbols is used to indicate a maximum value of the quantity of symbols on which the common search space is distributed in the current subframe.

In one embodiment, the resource location information includes at least one piece of symbol group information, and frequency domain location information corresponding to each piece of symbol group information, and one symbol group includes at least one symbol; and the processor 1202 is configured to:

determine a common search space within a time range corresponding to a first symbol group and at a frequency domain location in a frequency domain resource corresponding to the first symbol group, and detect whether control information is carried in the common search space; and determine, if no control information is carried in the common search space, a common search space within a time range corresponding to a next symbol group and at a frequency domain location in a frequency domain resource corresponding to the next symbol group, and detect whether control information is carried in the common search space, until the control information is detected or all symbol groups are traversed.

In one embodiment, the symbol is a minimum unit into which a time-frequency resource is divided in time domain.

In one embodiment, the receiver 1201 is configured to receive resource location information of the common search space, where the resource location information is transmitted by the network device through higher layer signaling.

In one embodiment, the receiver 1201 is configured to receive resource location information of the common search space, where the resource location information is transmitted by the network device in broadcast mode.

In one embodiment, the control information includes downlink control information, and the downlink control information is used to indicate a configuration parameter for uplink and downlink data transmission of the terminal device.

In one embodiment, the downlink control information further includes control channel symbol information.

In one embodiment, the receiver 1201 is further configured to receive control channel symbol information transmitted by the network device to the terminal device through higher layer signaling.

In one embodiment, the control channel symbol information is at least one of the following:

a total quantity of control channel symbols, a quantity of remaining control channel symbols, a total quantity of control channel symbols in a current subframe, a quantity of remaining control channel symbols in the current subframe, a total quantity of control channel symbols on a current beam, a quantity of remaining control channel symbols on the current beam, or a number of a start symbol of a data channel.

In one embodiment, the higher layer signaling is any one of the following:

medium access control-control unit signaling, non-access stratum signaling, radio resource control signaling, packet data convergence protocol signaling, or radio link control signaling.

In one embodiment, the processor 1202 is further configured to:

detect whether any control frame format indicator information carried on a physical control format indicator channel exists in all symbols indicated by a maximum quantity of symbols of the current subframe, where the control frame format indicator information is used to indicate the control channel symbol information.

In one embodiment, the processor 1202 is further configured to:

detect, in a symbol group on which the control information is detected, based on the control channel symbol information, downlink control information carried in a dedicated search space.

In one embodiment, the processor 1202 is further configured to:

detect whether any reference signal exists in all symbols indicated by a maximum quantity of symbols of the current subframe, where the reference signal is used to assist the terminal device in obtaining the control information.

In one embodiment, the processor 1202 is further configured to:

detect whether any hybrid automatic repeat request feedback information carried on a physical hybrid automatic repeat request indicator channel exists in all symbols indicated by a maximum quantity of symbols of the current subframe, where the hybrid automatic repeat request feedback information includes a response of the network device to receiving of uplink data from the terminal device.

In addition, it should be noted and understood that modules division of the foregoing network device and terminal device is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in this application may be integrated into one processing unit, or each of the units may exist alone physically, or two or more units are integrated into one unit. The integrated unit may be implemented in a form of hardware, or may be implemented in a form of hardware in addition to a software functional unit.

An embodiment of this application further provides a program. When executed by a processor, the program is configured to perform the resource processing method on a network device side in the embodiments shown in FIG. 3 to FIG. 7. An embodiment of this application further provides a program product, for example, a computer-readable storage medium, including the foregoing program. An embodiment of this application further provides a computer-readable storage medium. The computer-readable storage medium stores an instruction. When run on a computer, the instruction causes the computer to perform the resource processing method on a network device side in the embodiments shown in FIG. 3 to FIG. 7.

What is claimed is:

1. A method for resource processing comprising:
   determining, by a network device, at least two beams to be transmitted;
   determining, by the network device, a time-frequency resource corresponding to each of the at least two beams;
   determining, by the network device, a part of the time-frequency resource corresponding to each beam to serve as a common search space, wherein the part corresponding to the common search space and the time-frequency resource is used to carry control information transmitted to a terminal device; and
   determining, by the network device, a part of the time-frequency resource corresponding to each beam to carry control frame format indicator information, wherein the part of the time-frequency resource for carrying the control frame format indicator information does not overlap the part that corresponds to the common search space of the time-frequency resource.

2. The method according to claim 1, wherein the method further comprises:
   transmitting, by the network device, resource location information to the terminal device, wherein the resource location information is used to indicate a location of the common search space in the time-frequency resource.

3. The method according to claim 2, wherein the resource location information is used to indicate a location of a physical downlink control channel in the time-frequency resource corresponding to the common search space, wherein the physical downlink control channel is occupied in the common search space by the control information carried in the common search space.

4. The method according to claim 2, wherein the determining, by the network device, the time-frequency resource corresponding to each of the at least two beams comprises:
   determining, by the network device, a symbol group corresponding to each of the at least two beams, and obtaining, based on a time-frequency resource corresponding to the symbol group, the time-frequency resource corresponding to each of the at least two beams, wherein each symbol group comprises at least one symbol, wherein the part that corresponds to each common search space and the time-frequency resource is distributed on at least one symbol in each symbol group.

5. The method according to claim 4, wherein the resource location information comprises at least one piece of symbol group information and frequency domain resource information corresponding to each piece of symbol group information.

6. The method according to claim 1, wherein the control information comprises downlink control information, and the downlink control information is used to indicate a configuration parameter for uplink and downlink data transmission of the terminal device.

7. The method according to claim 6, wherein the downlink control information further comprises control channel symbol information.

8. The method according to claim 6, wherein the method further comprises:
   mapping, by the network device, a piece of downlink control information to each common search space.

9. The method according to claim 1, wherein the determining, by the network device, at least two beams to be transmitted comprises one of:
   determining, by the network device based on a type of the control information, the at least two beams to be transmitted; or
   determining, by the network device based on information about a direction of the terminal device, the at least two beams to be transmitted; or
   determining, by the network device based on a beam width, the at least two beams to be transmitted.

10. The method according to claim 1,
    wherein the control frame format indicator information is used to indicate control channel symbol information.

11. The method according to claim 1, wherein the method further comprises:
   determining, by the network device, a part of the time-frequency resource corresponding to each beam to serve as a dedicated search space, wherein the part that corresponds to the dedicated search space of the time-frequency resource is used to carry control information to be received by one terminal device.

12. The method according to claim 1, wherein the method further comprises:
   determining, by the network device, a part of the time-frequency resource corresponding to each beam to carry a reference signal, wherein the reference signal is used to assist the terminal device in obtaining the control information, and the part of the time-frequency resource for carrying the reference signal does not overlap the part that corresponds to the common search space and of the time-frequency resource; or
   determining, by the network device, a part of the time-frequency resource corresponding to each beam to carry hybrid automatic repeat request feedback information, wherein the hybrid automatic repeat request feedback information comprises a response of the network device to receiving of uplink data from the terminal device, and the part of the time-frequency resource for carrying the hybrid automatic repeat request feedback information does not overlap the part that corresponds to the common search space and of the time-frequency resource.

13. A method for resource processing comprising:
   receiving, by a terminal device, resource location information transmitted by a network device via a beam, the resource location information used to indicate a location of at least one common search space in a time-frequency resource; and
   detecting, by the terminal device based on the resource location information, whether control information carried in a common search space exists, wherein a part of the time-frequency resource corresponding to the beam is configured to carry control frame information indicator information that does not overlap the resource location information used to indicate the location of the at least one common search space in the time-frequency resource.

14. The method according to claim 13, wherein, the resource location information comprises frequency domain location information, and the detecting, by the terminal device based on the resource location information, whether control information carried in a common search space exists comprises:
   determining, by the terminal device, by starting from a first symbol of a current subframe, a common search space at a frequency domain location in a frequency domain resource corresponding to the first symbol, and detecting whether control information is carried in the common search space; and
   determining, if no control information is carried in the common search space, a common search space within a time range corresponding to a next symbol of the current subframe and at a frequency domain location in a frequency domain resource corresponding to the next symbol, and detecting whether control information is carried in the common search space, until the control information is detected or all symbols indicated by a maximum quantity of symbols are traversed, wherein the maximum quantity of symbols is used to indicate a maximum value of the quantity of symbols on which the common search space is distributed in the current subframe.

15. The method according to claim 13, wherein the resource location information comprises at least one piece of symbol group information, and frequency domain location information corresponding to each piece of symbol group information, and one symbol group comprises at least one symbol, and the detecting, by the terminal device based on the resource location information, whether control information carried in a common search space exists comprises:
   determining, by the terminal device, a common search space within a time range corresponding to a first symbol group and at a frequency domain location in a frequency domain resource corresponding to the first symbol group, and detecting whether control information is carried in the common search space; and
   determining, if no control information is carried in the common search space, a common search space within a time range corresponding to a next symbol group and at a frequency domain location in a frequency domain resource corresponding to the next symbol group, and detecting whether control information is carried in the common search space, until the control information is detected or all symbol groups are traversed.

16. A network device, comprising a processor, the processor configured to:
   determine at least two beams to be transmitted;
   determine a time-frequency resource corresponding to each of the at least two beams; and
   determine a part of the time-frequency resource corresponding to each beam to serve as a common search space, wherein the part that corresponds to the common search space of the time-frequency resource is used to carry control information transmitted to a terminal device; and
   determine a part of the time-frequency resource corresponding to each beam to carry control frame indicator information, wherein the part of the time-frequency resource for carrying the control frame format indicator information does not overlap the part that corresponds to the common search space of the time-frequency resource.

17. The network device according to claim 16, wherein the processor is further configured to:
   transmit resource location information to the terminal device, wherein the resource location information is used to indicate a location of the common search space in the time-frequency resource.

18. A terminal device comprising:
   a receiver configured to receive resource location information transmitted by a network device via a beam, wherein the resource location information is used to indicate a location of at least one common search space in a time-frequency resource; and
   a processor configured to detect, based on the resource location information, whether control information carried in a common search space exists, wherein a part of the time-frequency resource corresponding to the beam is configured to carry control frame information indicator information that does not overlap the resource location information used to indicate the location of the at least one common search space in the time-frequency resource.

19. The terminal device according to claim 18, wherein the resource location information comprises frequency domain location information, and the processor is further configured to:
- determine, by starting from a first symbol of a current subframe, a common search space at a frequency domain location in a frequency domain resource corresponding to the first symbol, and detect whether control information is carried in the common search space; and
- determine, if no control information is carried in the common search space, a common search space within a time range corresponding to a next symbol of the current subframe and at a frequency domain location in a frequency domain resource corresponding to the next symbol, and detect whether control information is carried in the common search space, until the control information is detected or all symbols indicated by a maximum quantity of symbols are traversed, wherein the maximum quantity of symbols is used to indicate a maximum value of the quantity of symbols on which the common search space is distributed in the current subframe.

20. The terminal device according to claim 18, wherein the resource location information comprises at least one piece of symbol group information, frequency domain location information corresponding to each piece of symbol group information, and one symbol group comprising at least one symbol, wherein the processor is further configured to:
- determine a common search space within a time range corresponding to a first symbol group and at a frequency domain location in a frequency domain resource corresponding to the first symbol group, and detect whether control information is carried in the common search space; and
- determine, if no control information is carried in the common search space, a common search space within a time range corresponding to a next symbol group and at a frequency domain location in a frequency domain resource corresponding to the next symbol group, and detect whether control information is carried in the common search space, until the control information is detected or all symbol groups are traversed.

* * * * *